US008306216B2

(12) United States Patent
Michiels et al.

(10) Patent No.: US 8,306,216 B2
(45) Date of Patent: Nov. 6, 2012

(54) METHOD AND SYSTEM FOR TRACKING OR IDENTIFYING COPY OF IMPLEMENTATION OF COMPUTATIONAL METHOD, AND COMPUTATION SYSTEM

(75) Inventors: Wilhelmus Petrus Adrianus Johannes Michiels, Eindhoven (NL); Paulus Mathias Hubertus Merchtildis Antonius Gorissen, Eindhoven (NL); Hendrik Dirk Lodewijk Hollmann, Eindhoven (NL)

(73) Assignee: Irdeto B.V. (NL)

( * ) Notice: Subject to any disclaimer, the term of this patent is extended or adjusted under 35 U.S.C. 154(b) by 546 days.

(21) Appl. No.: 12/522,402

(22) PCT Filed: Jan. 8, 2008

(86) PCT No.: PCT/IB2008/050038
§ 371 (c)(1),
(2), (4) Date: Jul. 8, 2009

(87) PCT Pub. No.: WO2008/084433
PCT Pub. Date: Jul. 17, 2008

(65) Prior Publication Data
US 2010/0299515 A1 Nov. 25, 2010

(30) Foreign Application Priority Data
Jan. 11, 2007 (EP) ..................................... 07100358

(51) Int. Cl.
*G06F 7/76* (2006.01)
(52) U.S. Cl. ................. 380/28; 726/28; 726/27
(58) Field of Classification Search .......... None
See application file for complete search history.

(56) References Cited

U.S. PATENT DOCUMENTS
2006/0153377 A1 7/2006 Arditti Modiano

FOREIGN PATENT DOCUMENTS
WO 0131419 A1 5/2001
WO 2007031894 A2 3/2007

OTHER PUBLICATIONS

A Revised Version of Crypton. Lim. 1999.*
Billet et al: "A Traceable Block Cipher"; Asiacrypt, International Conference on the Theory and Application of Cryptology and Information Security, Nov. 1, 2003, LNCS 2894, pp. 331-346.
Chow et al: "A White-Box DES Implementation for DRM Applications"; J. Feigenbaum (Ed.), DRM 2002, LNCS 2696, 2003, pp. 1-15.
Chow et al: "White-Box Cryptograpy and an AES Implementation"; K. Nyberg and H. Heys (Eds): SAC 2002, LNCS 2595, 2003, pp. 250-270.

* cited by examiner

*Primary Examiner* — Venkat Perungavoor
(74) *Attorney, Agent, or Firm* — Schwegman Lundberg & Woessner, P.A.

(57) ABSTRACT

A method and system is provided facilitating tracing copies of an implementation of a computational method where different versions of a network of look-up tables representing steps of the computational method are generated, and stored in a memory, each version being unique so that output encodings and/or input decodings of the white-box implementations of the computational method are different in the different versions. The network is formed by using an output value of a first look-up table as an input value of a second look-up table. The different versions are generated by changing at least one value in the network, end results of the version corresponding to a relevant domain of input values being substantially the same for each version. A method and system for computation for a user with the corresponding version in the memory, and/or for identifying a copy of an implementation of the computational method is provided.

18 Claims, 10 Drawing Sheets

METHOD AND SYSTEM FOR TRACKING OR IDENTIFYING COPY OF IMPLEMENTATION OF COMPUTATIONAL METHOD, AND COMPUTATION SYSTEM

FIELD OF THE INVENTION

The invention relates to a system for facilitating tracing copies of an implementation of a computational method.

BACKGROUND OF THE INVENTION

The Internet provides users with convenient and ubiquitous access to digital content. The use of the Internet as a distribution medium for copyrighted content creates the compelling challenge to secure the interests of the content provider. In particular it is required to warrant the copyrights and business models of the content providers. Increasingly, consumer electronics (CE) platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

To protect digital content, such as movies, from piracy, they are often delivered to a user in encrypted form. To keep the distribution cost low, the content is generally encrypted once, i.e., each legitimate user gets the same key with which he/she can decrypt the content. This implies the vulnerability that an attacker can distribute the key to unauthorized users, which breaks the protection mechanism.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by obfuscating the key in a network of look-up tables. This makes it more difficult for an attacker to extract and distribute the key.

SUMMARY OF THE INVENTION

It would be advantageous to have an improved system for facilitating tracing copies of an implementation of a computational method. To better address this concern, in a first aspect of the invention a system is presented comprising a network generator for generating a network of look-up tables representing steps of the computational method, the network being formed by using an output value of a first look-up table as an input value of a different second look-up table;

a personalizer for generating a plurality of different versions of the network of look-up tables by changing at least one value in the network of look-up tables, end results of the version corresponding to a relevant domain of input values being substantially the same for each version;

an associator for associating individual versions with individual stations or users of stations.

The personalizer makes use of an inherent redundancy in the network of look-up tables to create different versions of the network of look-up tables. When a (potentially illegal) copy of a version is found, the station or user associated with the version can be established because the versions are different and individual versions are associated with individual stations or users of stations.

The changes that are applied to generate different versions may be generally referred to as a watermark of a version. The network generator and the personalizer may be the same, i.e. one unit may generate all versions. The changed value may be a value in one of the look-up tables. It will be understood that the structure of the network (the structure defining which output of a look-up table is applied to which input of a look-up table) may be parameterized. In such a case, the changed value may relate to a parameter defining this structure.

In an embodiment, the computational method (602) includes a cryptographic scheme and a cryptographic key, the network generator (604) and the personalizer (606) being arranged for generating a network of look-up tables operable to perform the cryptographic scheme with the cryptographic key. The system is especially useful in this case, because cryptographic keys are often highly valuable. Illegal distribution of such keys is undesirable. The system helps to identify the associated station or user when an (illegally distributed) copy of a version of the network of look-up tables is found. In case an apparently redistributed copy of a version is found, some action can be taken against the associated user.

In an embodiment, the personalizer is arranged for creating white-box implementations of the computational method. White-box implementations of algorithms using a network of look-up tables are known from e.g. Chow et al. The redundancy and in particular the obfuscation in these white-box implementations make it easier to apply changes to the network that are difficult to isolate and/or remove by a third party (i.e. an attacker).

In an embodiment, output encodings and/or input decodings of the white-box implementations differ in different versions. A relatively simple way to make changes to create different versions of a network of look-up tables is to encode an output of one of the look-up tables in a different way, and decoding this in the next look-up table in the network of look-up tables.

In an embodiment, the personalizer is arranged for obfuscating the white-box implementations by means of an operator, the operator being differently chosen for different versions, where the operator is integrated in a first plurality of look-up tables in the network and an inverse of the operator is integrated in a second plurality of look-up tables in the network.

This makes it a relatively complex task for an attacker to remove the watermark completely, because coordinated changes in a plurality of look-up tables or to the structure of the network are required. An operator is integrated in a plurality of networks in the sense, that a plurality of the look-up tables contributes to the implementation of the operator. However, a result of the operator may not be directly visible in the white-box implementation because the look-up tables may provide additional encodings of intermediate and/or end results.

In an embodiment, at least one of the first plurality of look-up tables or at least one of the second plurality of look-up tables has input and/or output encodings undone by its respective predecessors and/or successors in the network with respect to a flow of data through the network. This makes it more difficult for an attacker to remove the watermark.

In an embodiment, the operator is a linear mixing bijection and at least one of the input and/or output encodings is non-linear. A linear mixing bijection combined with nonlinear input and/or output encodings is common for white-box implementations. The linear mixing bijections can efficiently be integrated in a plurality of look-up tables. The non-linear output and input encodings make the white-box implementation more difficult to break.

In an embodiment, the personalizer is arranged for creating versions using operators in different equivalence classes, where an equivalence class comprises operators of which the corresponding networks of look-up tables can be obtained from each other by applying modifications to the input and/or output encodings from a set of predetermined modifications. Applying modifications, including permutations, of the input and/or output encodings is a task that may be assumed to be in reach of an attacker. Therefore, the watermark should be 'resistant' to such modifications in that the watermark and the associated user can still be identified after such modifications have been applied. The individual equivalence classes are associated with the individual stations or users, because the individual versions are associated with the individual stations or users.

In an embodiment, the personalizer is arranged for creating versions in different equivalence classes, where an equivalence class comprises versions that can be obtained from each other by applying modifications to the version from a set of predetermined modifications. The set of predetermined modifications represents those modifications that are assumed to be in reach of an attacker. The watermark should be 'resistant' to such modifications that are in reach of the attacker. The watermark and the associated user can still be identified after such modifications have been applied, if the versions are in different equivalence classes. Preferably at most one version in each equivalence class is generated. The individual equivalence classes are associated with the individual stations or users, because the individual versions are associated with the individual stations or users.

An embodiment comprises an output for delivering the individual version of the network of look-up tables to the associated station or user via a single medium. This allows the stations or users to receive the network of look-up tables conveniently via the single medium. No portions of the network need to be pre-programmed in the stations. In this way, over time differently changed versions may be associated with and easily delivered to the individual stations/users, without requiring a use of a second medium or without requiring any hardware or firmware changes to the stations. It makes the system more efficient, because the stations can be pre-programmed independently of the changes made to the individual versions. Optionally the stations are identical. Although the versions might be (illegally) distributed among users, the origin of such a (illegally) distributed version can be traced because the version is associated with the station or user of the station to which the version of the network was first delivered using the medium. Too easy (illegal) distribution may still be prevented by delivering the versions of the network of look-up tables in an encrypted form.

In an embodiment, the system is for controlled distribution of content to a plurality of stations, and the computational method comprises a decryption method, the system further comprising an encryptor for encrypting the version associated with the user with using a user-specific cryptographic key associated with the user, to obtain an encrypted version;

a content preprocessor for encrypting content according to the cryptographic scheme and the cryptographic key, to obtain encrypted content;

an output for providing the user with the encrypted version and the encrypted content.

This embodiment describes a particular application context. The versions may be encrypted using a user-specific key and provided to the individual users. Alternatively, the version may be delivered without encryption, for example via a secure channel or medium. In another embodiment, a part of the network of look-up tables is fixed in advance and already present at the user, and only the remaining part of the network of look-up tables is provided to the user.

An embodiment comprises a system for performing a computation for a user, comprising a data processing unit for applying a network of look-up tables representing steps of a computational method to data, the network being formed by using an output value of a first look-up table as an input value of a different second look-up table;

the network of look-up tables forming a version of a plurality of different versions of the network of look-up tables obtained by changing at least one value in the network of look-up tables, end results of the computational method corresponding to a relevant domain of input values being substantially the same for each version;

individual versions being associated with individual users.

This can be implemented in a station or user terminal to process data according to the version of the network of look-up tables.

An embodiment comprises a system for identifying a copy of an implementation of a computational method, wherein the implementation comprises a network of look-up tables representing steps of the computational method, the network being formed by using an output value of a first look-up table as an input value of a different second look-up table;

the network of look-up tables being a version of a plurality of different versions of the network of look-up tables obtained by changing at least one value in the network of look-up tables, end results of the version corresponding to a relevant domain of input values being substantially the same for each version;

the system comprising:

a comparator for comparing at least one of the look-up tables in the implementation with at least one of the versions.

This helps to identify the user associated with a particular version.

An embodiment comprises an equivalence class establisher for establishing an equivalence class corresponding to the version in the implementation, where an equivalence class comprises versions that can be obtained from a starting version by applying modifications to the version from a set of modifications assumed to be in reach of an attacker. This helps to identify the user even after the watermarked version has been changed.

An embodiment comprises a method of facilitating tracing users of copies of an implementation of a computational method, the system comprising generating a network of look-up tables representing steps of the computational method, the network being formed by using an output value of a first look-up table as an input value of a different second look-up table;

generating a plurality of different versions of the network of look-up tables by changing at least one value in the network of look-up tables, output values of the version corresponding to a relevant domain of input values being substantially the same for each version;

associating individual versions with individual users.

An embodiment comprises a method of identifying a copy of an implementation of a computational method, wherein the implementation comprises a network of look-up tables representing steps of the computational method, the network (28) being formed by using an output value of a first look-up table (20) as an input value of a different second look-up table;

the network of look-up tables being a version of a plurality of different versions of the network of look-up tables by changing at least one value in the network of look-up tables, end results of the version corresponding to a relevant domain of input values being substantially the same for each version;

the method comprising:

comparing at least one of the look-up tables in the implementation with at least one of the versions.

An embodiment comprises a computer program product comprising instructions for causing a processor to perform any of the methods set forth.

WO 01/31419 discloses a computer-implemented method in which information is encrypted with a key having personal value and known to a user of the client to inhibit the user from sharing the key with others.

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
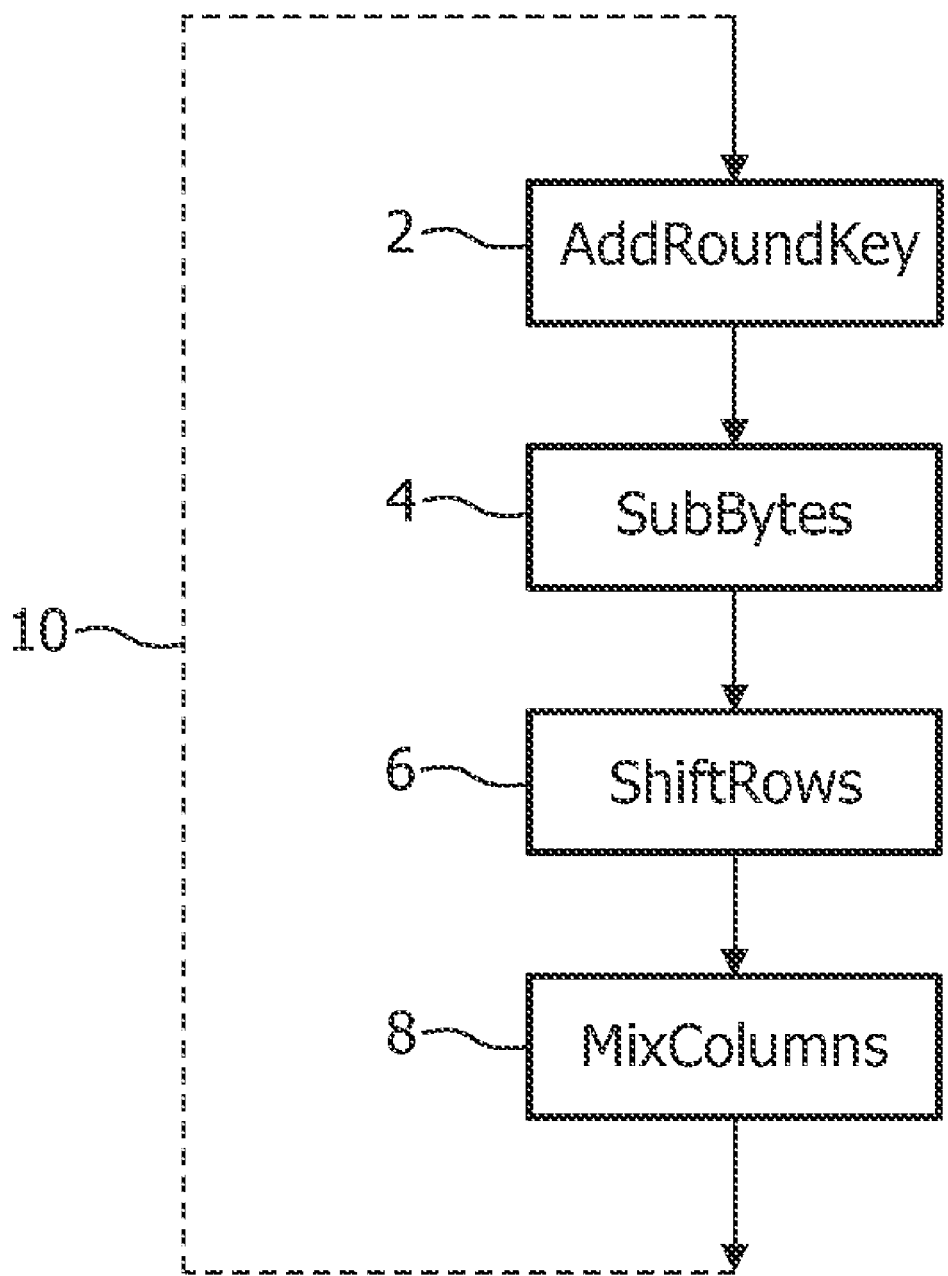
FIG. 1 is a diagram illustrating operations in a round of AES.

White-box cryptography is about implementing a block cipher for a fixed key K, such that it is difficult for an attacker to extract key K from the implementation. The attack model that is assumed in white-box cryptography is the white-box attack model. In this attack model, the attacker is assumed to have full access to the software and to have full control over the execution environment.

An embodiment is related to a conditional access system for pay TV. A content provider broadcasts content that is encrypted with AES and a content key K. One of the problems that have to be solved in relation to the conditional access system is how to distribute the content key K for decrypting the content to subscribers and to no-one else. Two approaches are described in the following. A first, naïve approach is to keep the content key K fixed over time and to only provide the subscribers with the key K. However, this implementation has the following two disadvantages. The first disadvantage is that we can not unsubscribe a user. Once having key K, a user can decrypt content forever. A second disadvantage of this naïve implementation is that by using a fixed key for a long time, the risk that an attacker can find it increases.

A second approach works as follows. The content key is changed regularly, for instance each day or each week. Each subscriber s gets a unique secret key $k_s$ and for each subscriber s the key K is encrypted with its secret key $k_s$. The collection $\{E_k(K) | s \text{ is legal subscriber}\}$ of encryptions of key K is broadcasted together with the encrypted content. Then only the legal subscribers can obtain K and subsequently decrypt the content. It is important that the key $k_s$ is hidden well. Generally this is done in hardware. In this approach it is possible to unsubscribe a user. To unsubscribe user s, he is not provided with the encrypted content key the next time that it changes. Hence, if the content key changes from K to K', then user s is not provides with $E_{k_s}(K')$.

Although the second approach described is better than the first one, it still yields a vulnerable conditional access system because of the following attack. One of the subscribers may be able to derive content key K. This can, for instance, be the case because a subscriber s can inspect the decryption algorithm and extract the key from it or because s is able to determine his/her own key $k_s$. When the content key K is next illegally distributed, the content provider is not able to identify the malicious subscriber that is responsible for this distribution. As a result, the content provider may have to take rigorous actions such as replacing for all subscribers—including the legitimate ones—the implementation of the decryption algorithm and/or their key $k_s$.

In an embodiment, the implementation of the decryption algorithm for decrypting the content with key K is replaced by a white-box implementation substantially as described by Chow et al. In this white-box implementation, the AES decryption algorithm is implemented by a collection of lookup tables, which are obfuscated by encoding their input and output. In addition, different encodings are applied to the tables of different subscribers. As a result, each subscriber gets a different white-box implementation. However, all these white-box implementations have the same functionality (it performs decryption with key K). If the content key K changes, then the subscribers may be provided with a new white-box implementation (that is, with a new collection of lookup tables).

If the white-box implementation is sufficiently secure, then it is not easy for an attacker to extract the underlying key K and publish it. Instead, he/she has to publish the complete white-box implementation (that is, the collection of look-up tables). However, if a malicious subscriber publishes his/her white-box implementation, then the content provider can trace him/her because he has a unique white-box implementation. As a result, the content provider can revoke the attacker, i.e., withdraw the attacker's subscription. This means that for further content, which is encrypted with a different key K', the attacker will not receive a white-box implementation that implements the decryption algorithm with key K'.

By choosing different encodings, multiple white-box implementations can be created with the same functionality (for instance, they all implement AES decryption with key K). This variation can be used for traitor tracing: Each user is given a different variant of the white-box implementation, such that, given a white-box implementation, it is possible to identify the origin of the white-box implementation by inspecting the encodings. Note that the encodings of a white-box implementation play the role of a forensic watermark here.

In the following, some embodiments are described using the AES white-box implementation proposed by Chow et al. However, the embodiments are not restricted to AES. A skilled person can make the necessary changes to apply the techniques disclosed also to other encryption schemes, in particular to white-box implementations thereof. Also, the techniques can be applied outside the context of encryption, in any situation where an algorithm comprises applying a network of look-up tables, as will be appreciated by the skilled person.

A White-Box Implementation of AES

AES is a block cipher with a block size of 128 bits or 16 bytes. The plaintext is divided in blocks of 16 bytes which form the initial state of the encoding algorithm, and the final state of the encoding algorithm is the ciphertext. To conceptually explain AES, the bytes of the state are organized as a matrix of 4×4 bytes. AES consists of a number of rounds. Each round is composed of similar processing steps operating on bytes, rows, or columns of the state matrix, each round using a different round key in these processing steps.

FIG. 1 illustrates some main processing steps of a round of AES. The processing steps include:

AddRoundKey 2—each byte of the state is XOR'ed with a byte of the round key.

SubBytes 4—A byte-to-byte permutation using a lookup table.

ShiftRows 6—Each row of the state is rotated a fixed number of bytes.

MixColumns 8—Each column is processed using a modulo multiplication in $GF(2^8)$.

The steps SubBytes 4, ShiftRows 6, and MixColumns 8 are independent of the particular key used. The key is applied in the step AddRoundKey 2. Except for the step ShiftRows 6, the processing steps can be performed on each column of the 4×4 state matrix without knowledge of the other columns. Therefore, they can be regarded as 32-bit operations as each column consists of 4 8-bit values. Dashed line 10 indicates that the process is repeated until the required number of rounds has been performed.

Each of these steps or a combination of steps may be represented by a lookup table or by a network of lookup tables (S-boxes). It is also possible to replace a full round of AES by a network of lookup tables. For example, the AddRoundKey step can be implemented by simply XOR'ing with the round key, while the SubBytes, ShiftRows, and MixColumns steps are implemented using table lookups. However, this means that the key is still visible to the attacker in the white-box attack context. The AddRoundKey step can also be embedded in the lookup tables, which makes it less obvious to find out the key.

Figure 2:
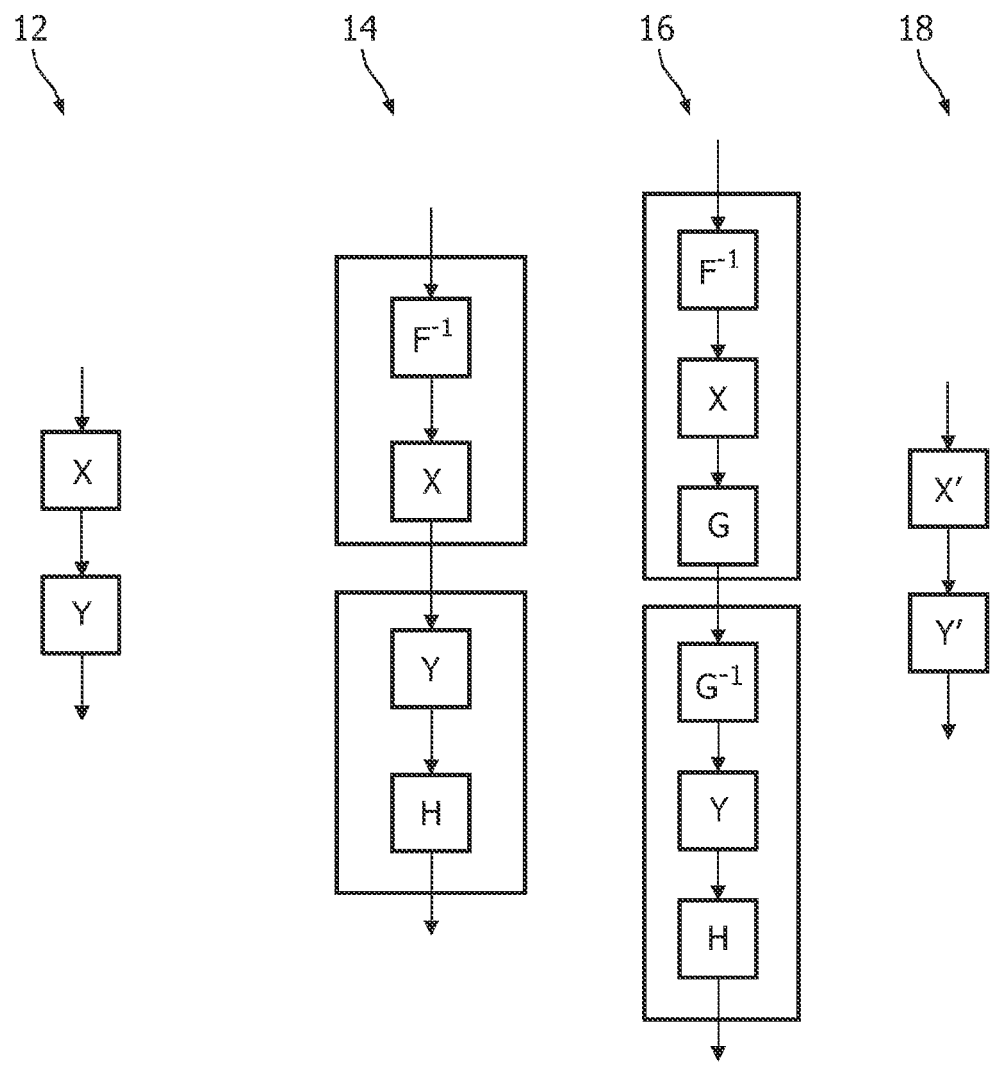
FIG. 2 is a diagram illustrating an example of obfuscating tables.

FIG. 2 illustrates a way to make it even more difficult to extract the key. Let X and Y be two functions. Consider an operation $Y \circ X(c) = Y(X(c))$, where $\circ$ denotes function composition, illustrated as diagram 12 in FIG. 2, where c is an input value, for example a 4-byte state column. However, the approach applies to any type of input value c. Mappings X and Y can be implemented as look-up tables which can be stored in memory, however, when they are stored in memory the values can be read by an attacker. Diagram 14 illustrates how the contents of the look-up tables can be obfuscated by using an input encoding F and an output encoding H. Look-up tables corresponding to $X \circ F^{-1}$ and $H \circ Y$ are stored as illustrated instead of X and Y, making it more difficult to extract X and Y. Diagram 16 shows how to add an additional, for example random, bijective function G, such that the intermediate result of the two tables is also encoded. In this case, two tables are stored in memory: $X' = G \circ X \circ F^{-1}$ and $Y' = H \circ Y \circ G^{-1}$. This is illustrated once more in diagram 18:

$$Y' \circ X' = (H \circ Y \circ G^{-1}) \circ (G \circ X \circ F^{-1}) = H \circ (Y \circ X) \circ F^{-1},$$

where X and Y are functions suitable for implementation by means of look-up tables. In this document, $\circ$ denotes function composition as usual (i.e., for any two functions f(x) and g(x), $f \circ g(x) = f(g(x))$ by definition). Likewise a network consisting of more than two functions can be encoded. The actual tables encoding X and Y are obfuscated by combining $H \circ Y \circ G^{-1}$ in a single look-up table and combining $G \circ X \circ F^{-1}$ in a single look-up table. As long as F, G, and/or H remain unknown, the attacker cannot extract information about X and/or Y from the look-up tables, and hence the attacker cannot extract the key that is the basis for X and/or Y. Other cryptographic algorithms, including DES and Rijndael (of which AES is a particular instantiation), may also be encoded as a (cascade or network of) look-up tables that may be obfuscated in a way similar to the above. This also holds for ciphers based on for example substitution-permutation networks or Feistel networks. The invention is not limited to the exemplary cryptographic algorithms mentioned.

Chow 1 discloses a method with the intend to hide the key by encoding its tables with random bijections representing compositions rather than individual steps. Preventing secret-key extraction has the advantage that an attacker is prevented from extracting keying material which would allow software protection goals to be bypassed on other machines, or from publishing keying material effectively creating 'global cracks' which defeat security measures across large user-bases of installed software. It provides an increased degree of protection given the constraints of a software-only solution and the hostile-host reality. In the approach of Chow 1, the key is hidden by (1) using tables for compositions rather than individual steps; (2) encoding these tables with random bijections; and (3) extending the cryptographic boundary beyond the crypto algorithm itself further out into the containing application, forcing attackers (reverse engineers) to understand significantly larger code segments to achieve their goals. Chow 1 discusses a fixed key approach: the key(s) are embedded in the implementation by partial evaluation with respect to the key(s), so that key input is unnecessary. Partial evaluation means that expressions involving the key are evaluated as much as reasonably possible, and the result is put in the code rather than the full expressions. The attacker could extract a key-specific implementation and use it instead of the key, however cryptography is typically a component of a larger containing system that can provide the input to the cryptographic component in a manipulated or encoded form, for which the component is designed, but which an adversary will find difficult to remove. Referring to the step of encoding tables, since encodings are arbitrary, results are meaningful only if the output encoding of one step matches the input encoding of the next. For example, if step X is followed by step Y (resulting in computation of $Y \circ X$), the computation could be encoded as $$Y' \circ X' = (H \circ Y \circ G^{-1}) \circ (G \circ X \circ F^{-1}) = H \circ (Y \circ X) \circ F^{-1}.$$

This way, Y∘X is properly computed albeit that the input needs to be encoded with F and the output needs to be decoded with $H^{-1}$. The steps are separately represented as tables corresponding to Y' and X', so that F, G, and H are hidden as well as X and Y.

Apart from such confusion steps, Chow 1 uses diffusion steps by means of linear transformations to further disguise the underlying operations. The term mixing bijection is used to describe a linear bijection, used in the above sense. The implementation of Chow 1 takes input in a manipulated form, and produces output in a differently manipulated form, thereby making the white-box attack context (WBAC) resistant AES difficult to separate from its containing application.

A White-box AES implementation can be sketched as follows. The input to the AES encryption and decryption algorithm is a single 128-bit block. This block is represented by a 4×4 matrix consisting of 16 bytes. AES usually consists of 10 rounds for AES-128. Each round updates a set of sixteen bytes which form the state of AES, thus each AES round processes 128 bits. AES-128 uses a key of 128 bits. This key serves as input for an algorithm which converts the key into different round keys of 128 bits. A basic round consists of four parts:
SubBytes
ShiftRows
MixColumns
AddRoundKey.

This order of operations applies to AES encryption. Although the standard order of operations in AES decryption is different, it is possible to rewrite the AES decryption algorithm to have the same order of operations as for AES encryption.

Before the first round, an extra AddRoundKey operation occurs, and in round ten the MixColumns operation is omitted. The only part that uses the key is AddRoundKey, the other three parts do nothing with the key. In the implementation the boundaries of the rounds are changed to integrate the AddRoundKey step and the SubBytes step of the next round into one step. A round begins with AddRoundKey and SubBytes followed by ShiftRows and finally MixColumns.

First, the key is hidden by composing the SubBytes step and the AddRoundKey together into one step. This makes the key no longer visible on its own. Because the key is known in advance, the operations involving the key can be pre-evaluated. This means that the standard S-Boxes which are used in the step SubBytes can be replaced with key-specific S-Boxes. To generate key-specific instances of AES-128, the key is integrated into the SubBytes transformations by creating sixteen 8×8 (i.e. 8-bit input, 8-bit output) lookup tables $T_{i,j}^r$ which are defined as follows:

$$T_{i,j}^r(x)=S(x \oplus k_{i,j}^{k-1}),\ i=0,\ldots,3;\ j=0,\ldots,3;\\ r=1,\ldots,9,$$

where S is the AES S-box (an invertible 8-bit mapping), and $k_{i,j}^r$ is the AES sub-key byte at position i, j of the 4×4 matrix which represents the round key for round r. These T-boxes compose the SubBytes step with the previous round's AddRoundKey step. The round 10 T-boxes absorb the post-whitening key as follows:

$$T_{i,j}^{10}(x)=S(x \oplus k_{i,j}^9) \oplus k_{sr(i,j)}^{10},\ i=0,\ldots,3;\ j=0,\ldots,3,$$

where sr(i, j) denotes the new location of cell i, j after the ShiftRows step. The total number of T-boxes is 10×16=160. However, the key can easily be recovered from T-boxes because $S^{-1}$ is publicly known. This makes additional encodings necessary. Linear transformations are used for diffusing the inputs to the T-boxes. These linear transformations are called mixing bijections and can be represented as 8×8 matrices over GF(2). The mixing bijections are inverted by an earlier computation to undo their effect.

Figure 3:
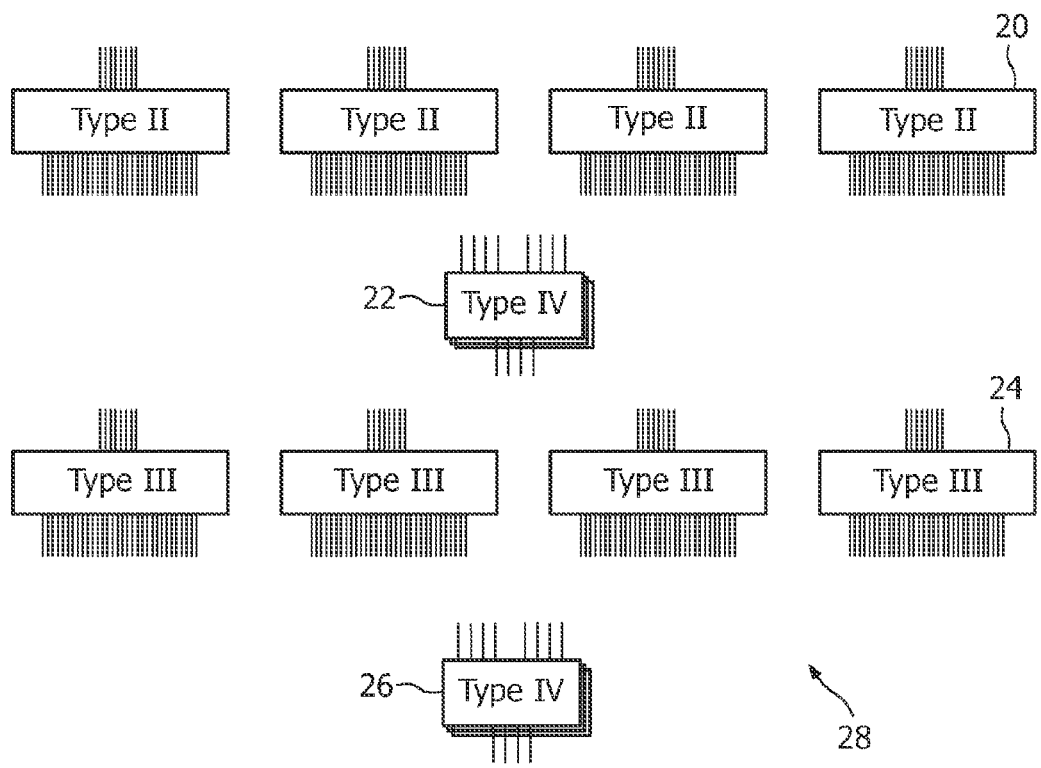
FIG. 3 is a diagram illustrating a round for a column in a white-box AES implementation.

FIG. 3 illustrates the tables involved in a round of white-box AES for one 32-bit column of the state (after applying ShiftRows). The names of the different types of tables are introduced here. They are discussed in more detail hereinafter. Before the rounds, each byte of the 128-bit state is applied to a respective type Ia table. This results in respective 128-bit values which are XOR'ed using a network of type IV tables to provide a 128-bit output that is divided into four 32-bit values. Now, the first round starts. The processing steps of each 32-bit value are outlined here. The four bytes of the 32-bit value are input to four respective type II tables 20. Each of the four type II tables 20 result in a 32-bit output. These outputs are bitwise XOR'ed using type IV tables 22. Each type IV table 22 performs a 4-bit bitwise XOR. By properly connecting inputs and outputs of type IV tables, the bitwise XOR of the four 32-bit outputs can be realized as will be understood by the skilled artisan. The result of this step is a 32-bit value. Each of the four bytes of this value is applied to a respective type III table 24. Each type III table provides a 32-bit output. These outputs are again bitwise XOR'ed using a network of type IV tables 26 similar to the network of type IV tables 22. The output is a 32-bit value indicative of a column of the state. Round 2 to 9 are similar to this first round. Each byte of the 128-bit value is applied to a type Ib table; the results are XOR'ed using a network of type IV tables. The last round (usually the tenth round) may be absorbed by the external encoding.

Figure 4:
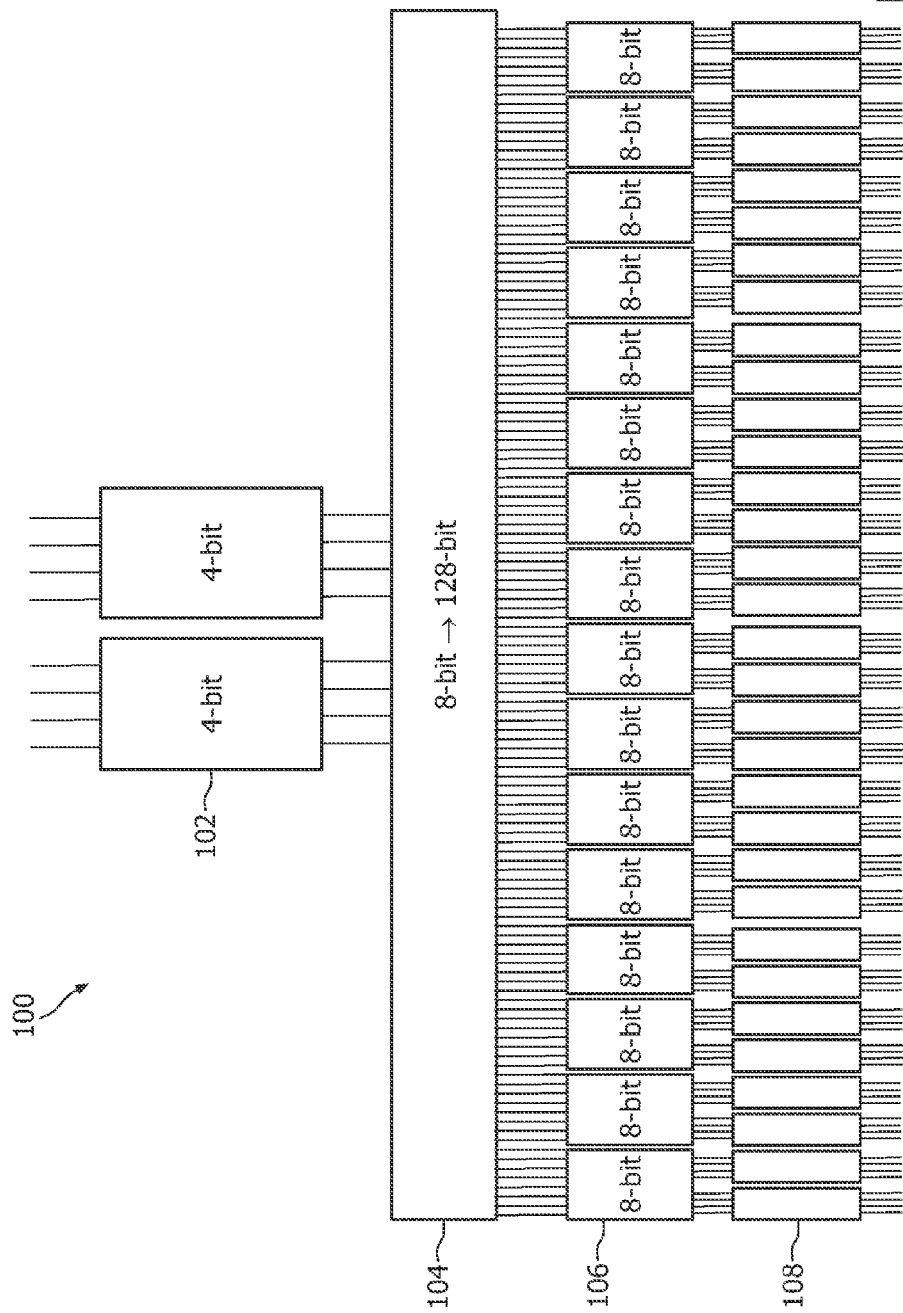
FIG. 4 is a diagram illustrating mappings incorporated in a type Ia table.
Figure 5:
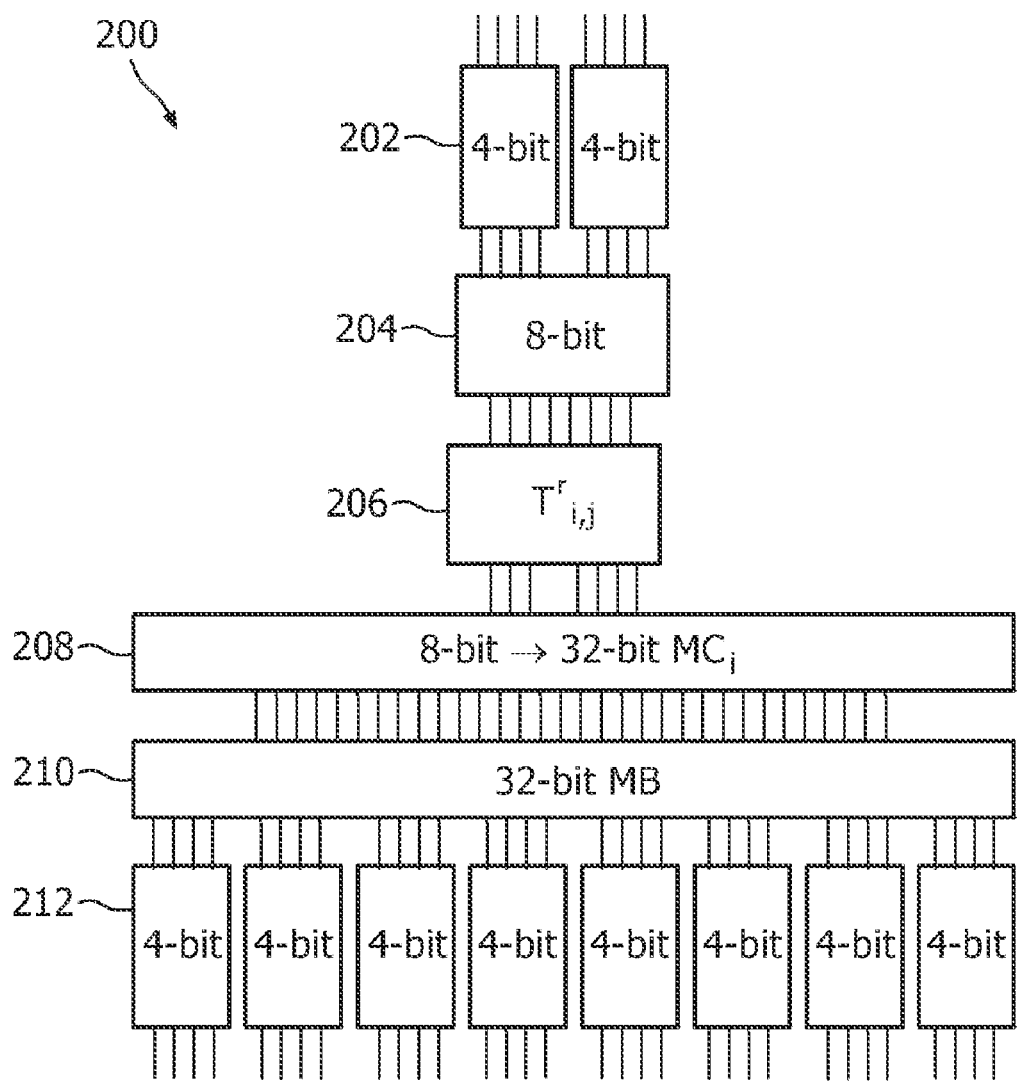
FIG. 5 is a diagram illustrating mappings incorporated in a type II table.
Figure 6:
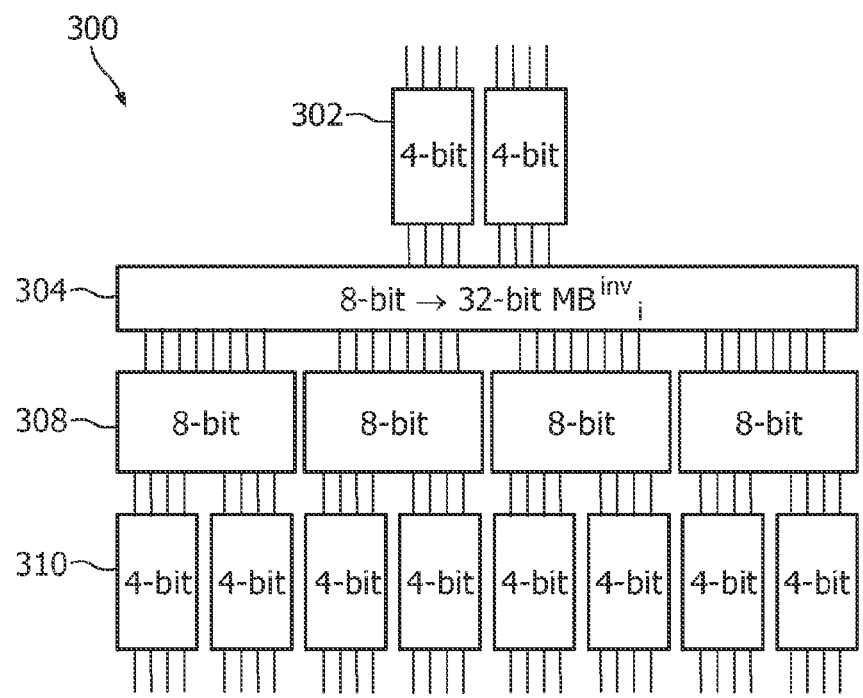
FIG. 6 is a diagram illustrating mappings incorporated in a type III table.
Figure 7:
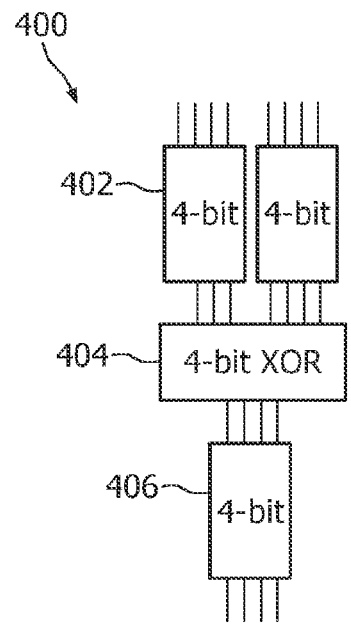
FIG. 7 is a diagram illustrating mappings incorporated in a type IV table.
Figure 8:
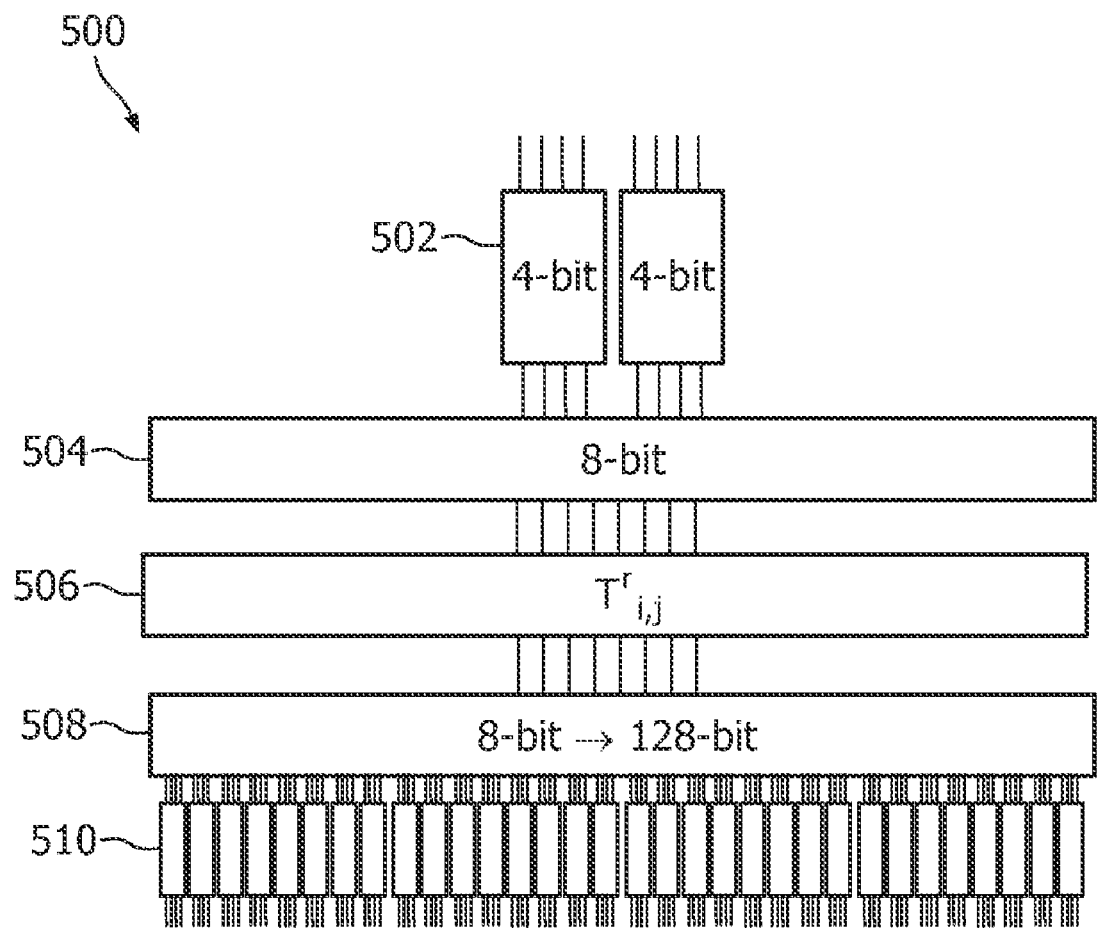
FIG. 8 is a diagram illustrating mappings incorporated in a type Ib table.

FIG. 4 illustrates a type Ia table 100. FIG. 5 illustrates a type II table 200. FIG. 6 illustrates a type III table 300. FIG. 7 illustrates a type IV table 400. FIG. 8 illustrates a type Ib table 500.

The mixing bijections are used as follows. An AES state is represented by a 4×4 matrix consisting of bytes. The MixColumns step operates on a column (four 8-bit cells) at a time. Consider a 32×32 matrix MC. If this is represented by a table, this table would cost $2^{32} \times 32=137438953472$ bits=16 GB. In order to avoid such large tables the matrix is blocked into four sections.

MC is blocked into four 32×8 sections, $MC_0$, $MC_1$, $MC_2$, $MC_3$ (block 208). Multiplication of a 32-bit vector $x=(x_0,\ldots,x_{31})$ by MC is done by dividing the bits of x into four bytes and multiplying each of the sections of MC with one of the bytes, yielding four 32-bit vectors ($z_0, \ldots, z_3$). This is followed by three 32-bits XORs giving the final 32-bit result z. The four tables together only cost $4 \times 2^8 \times 32=32768$ bits=4 KB.

The three XORs will be divided into 24 4-bit XORs, each represented by a possibly encoded look-up table, with appropriate concatenation (e.g. ((z[0, 0], z[0, 1], z[0, 2], z[0, 3])+(z[1, 0], z[1, 1], z[1, 2], z[1, 3]))||((z[0, 4], z[0, 5], z[0, 6], z[0, 7])+(z[1, 4], z[1, 5], z[1, 6], z[1, 7]))|| . . . ), where || denotes concatenation and + denotes XOR. By using these strips and subdivided XORs, each step is represented by a small lookup table. In particular, for i=0, . . . , 3 the $z_i$ are computed using 8×32 tables, while the 4-bit XORs become 24 8×4 tables. FIG. 7 illustrates how input decodings 402 and output encodings 406 can be put around the XORs 404. These encodings are usually randomly chosen non-linear 4×4 bijections. The XOR tables are called type IV tables 400. The type IV tables take as input 4 bits from each of two previous computations. The output encodings 212 of those computations are matched with the input decodings 402 for the type IV tables to undo each other. The choice for 4×4 non-linear bijections depended on the size of the tables. In this situation a type IV table is only $2^8 \times 4$ bits=128 bytes. 24 tables are needed which cost together 3 KB. If the XORs were not divided, three XOR tables would be needed which computed 32-bit XORs. The T-boxes 206 and the 8×32 tables 208 could be represented as separate lookup tables. Instead, they can be composed creating new 8×32 tables 200 computing the SubBytes and AddRoundKey transformations as well as part of MixColumns. This saves both space (to store the T-boxes) and time (to perform the table lookups).

Before splitting MC into $MC_i$ as above, MC will be left-multiplied by a 32×32 mixing bijection MB, illustratively indicated in FIG. 5 at reference numeral 210, chosen as a non-singular matrix with 4×4 sub-matrices of full rank. The use of mixing bijections increases the number of possible constructions for a particular table.

FIG. 5 illustrates an 8×32 type II table 200 including 4×4 input decodings 202 and 4×4 output encodings 212. These output encodings and input decodings are non-linear 4×4 bijections which must match the input decodings and output encodings of the type IV tables 400. The type II tables 200 are followed by type IV tables 400. In order to invert MB, an extra set of tables is used for calculating $MB^{-1}$. Let $(x'_0, \ldots, x'_{31})$ be the input to MixColumns, and let $(z_0, \ldots, z_{31})$ be the output after MixColumns. Let $(z'_0, \ldots, z'_{31})^T$ be the result after multiplication with MB. $(z'_0, \ldots, z'_{31})^T$ serves as input to the type III tables 300. Note that the input decodings and the output encodings need not be considered here because the output encoding of a table is undone by the input decoding of a next table. In the type III tables 300, $MB^{-1}$ is applied 304 and the inverses 308 of the four input mixing bijections 204 of the next round's four type II tables 200.

FIG. 6 illustrates an 8×32 type III table 300 including 4×4 non-linear input decodings and 4×4 non-linear output encodings. These tables are followed by corresponding type IV tables 400.

One round of data operations involves an operation on a 128-bit state matrix. The data operations performed on each of four strips of 32 bits of the 128-bit state matrix is as follows. The 32-bit strip is divided into four 8-bit bytes. Each of the four bytes is fed into a distinct type II table 200, resulting in four 32-bit output values. These values have to be XOR'ed using obfuscated type IV tables 400. To that end, each 32-bit output value is divided into eight 4-bit nibbles, and appropriate pairs of nibbles are input to respective type IV tables, such that the XOR of the four 32-bit output values is obtained in encoded form.

This 32-bit resulting encoded XOR'ed result is again divided into bytes, and each byte is input to a distinct type III table 300. The input decoding of each nibble of the type III tables corresponds to the output encoding of the last applied type IV tables. The type III tables again result in four 32-bit output values that are again XOR'ed using obfuscated type IV tables 400.

In summary, the rounds are implemented by lookup tables. The lookup tables of a single round are networked as follows. The data is fed into Type II tables. The output of these tables is fed to a network of Type IV tables representing encoded XORs. The output of this network is fed to Type III tables canceling the mixing bijection encoding that is inserted by the Type II tables. The encoded output of the round is finally derived by feeding the output of the Type III tables into, again, a network of Type IV tables representing encoded XORs.

Furthermore, the white-box implementation contains Type I tables at the beginning (type Ia table 100) and the end (type Ib table 500) for respectively canceling out and inserting external encodings. The type Ia table 100 can be used to apply a concatenation of mappings as illustrated in FIG. 4 by applying a single table look-up. In the concatenation, a 4-bit nibble input decoding 102 appears first. Then, an 8-bit to 128-bit bijection 104 appears; this bijection effectuates an encoding of the input and output of the network; this mapping can be undone elsewhere in the program. The result of bijection 104 is split in 16 eight-bit pieces to which respective 8-bit bijections 106 are applied. Finally, the output nibble encoding 108 is applied. As mentioned, the cascade of mappings 102, 104, 106, and 108 is pre-evaluated and the final result is tabulated in a look-up table. This results in a table with at most 256 entries of 128 bits each. The concatenation of mappings incorporated in a type Ib table 500 is schematically displayed in FIG. 8. The first mapping is the input nibble decoding 502, which is followed by an 8-bit bijection 504, a T-box $T^r_{i,j}$ 506, where r corresponds to the last round, an 8-bit to 128 bit mapping for providing output encoding, and output nibble encodings 510. The 128-bit output of this kind of table is XOR'ed with the output of other type Ib tables, again making use of nibble input and output encoded type IV tables 400. The output encoding 508 is undone elsewhere in the program, i.e., outside the cryptographic part of the program. This makes it more difficult for an attacker to break the encodings of the tables by analyzing only an input and an output of the cryptographic part of the program.

White-box cryptography involves implementing a block cipher in software, such that an attacker cannot even extract the key in the white-box attack model. The white-box attack model is among the strongest conceivable attack models, because the attacker is assumed to have full access to the implementation and full control over the execution environment. White-box implementations exist for AES, DES, and other encryption schemes. These white-box implementations may be based on similar ideas set forth above, and a skilled person is able to apply the principles of white-box implementations to create white-box implementations of other cryptographic schemes.

Watermark

A forensic watermark may be added to a white-box implementation, such that if a malicious user distributes his/her implementation, we can trace this user. In other words, multiple white-box implementations $X_i, X_2, \ldots, X_n$ may be created such that it is possible to determine, given a particular white-box implementation Y, to which of the implementations $X_i, X_2, \ldots, X_n$ it corresponds. The implementation Y need not be exactly the same as an implementation $X_i$ because a malicious user u may be able to make some modifications to his/her implementation $X_i$ without changing the functionality.

In an embodiment, a forensic watermark is added to a white-box AES implementation. In this approach, a plurality of white-box AES implementations is created by choosing different encodings for obfuscating the tables of a white-box implementation. We create multiple white-box AES implementations $X_1, X_2, \ldots, X_n$ by choosing different encodings. For instance, define $X_1, X_2, \ldots, X_n$ such that they only differ in the non-linear nibble encoding f of the first output nibble of a given Type II table U (212 in FIG. 5). Note that this implies that for a succeeding Type IV XOR-table V, also one of the two input nibble decodings g is different in the different implementations. The reason is that $g=f^{-1}$: the output encoding f put on the first output nibble of U is canceled out by the nibble decoding incorporated in XOR table V. The skilled person will appreciate that this is not restricted to the first output nibble of a Type II table. Any pair of corresponding output nibble encoding and input nibble decoding can be used to apply a watermark. Also any combination of such pairs can be used as the watermark. A particularly strong watermark can be obtained by randomly selecting all nibble encodings/decodings, and doing this differently for each user. This has the additional advantage that, if an attacker is capable of modifying only some of the nibble encoding/decoding pairs, the user can still be identified by the remaining nibble encoding/decoding pairs.

Changing the nibble encodings does not influence the result of the decryption. As the nibble output encodings are undone in the nibble input decodings of another table, the end result is the same. Therefore many different versions of the tables may be distributed to different users, where all of these versions represent the same cryptographic method with the same cryptographic key.

Figure 9:
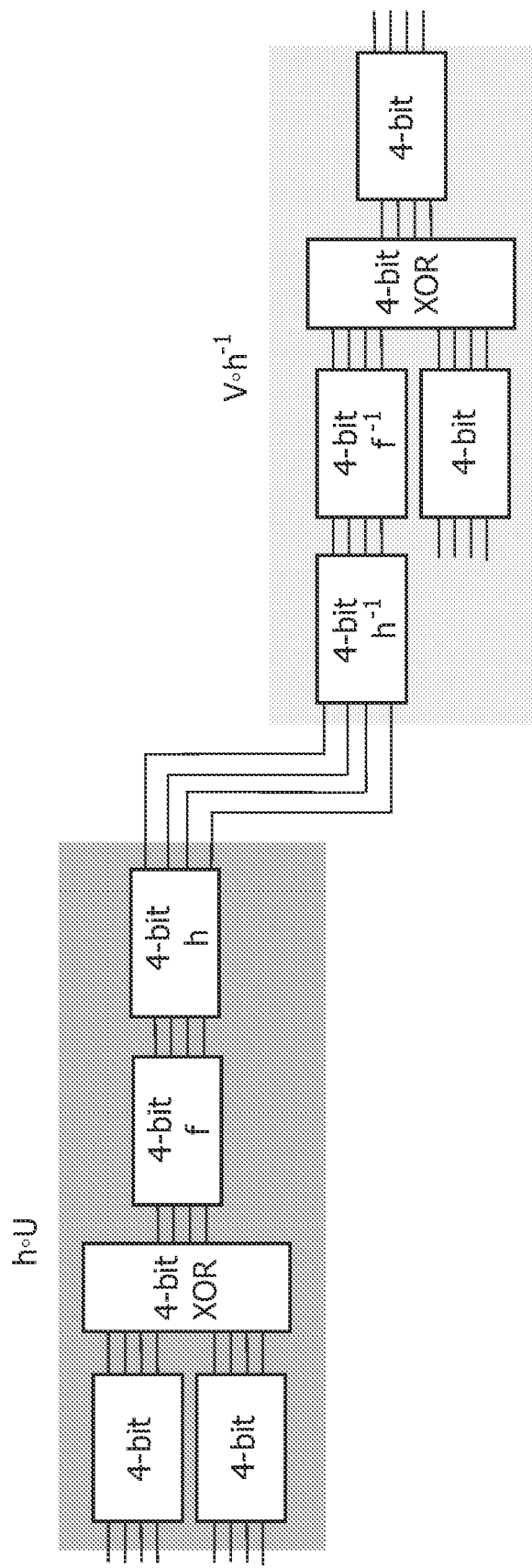
FIG. 9 is a diagram illustrating a flow of information bits from one look-up table to a next look-up table in a network of look-up tables.

An attacker can change a nibble encoding as follows. Let U, V be two successive tables in the white-box AES implementation and let f be the output encoding of the nibble returned by table U. Note that this means that table V has input nibble decoding $f^{-1}$, i.e., table V applies $f^{-1}$ to the nibble coming from U. This output encoding can be changed to an arbitrary (non-linear) encoding g. Define h such that $g = h \circ f$: Then encode the output of U by h, and incorporate the nibble decoding $h^{-1}$ in V. In FIG. 9 this principle is illustrated for the special case of a type IV table. The result of this action is that the output encoding of the table U is given by g. Furthermore, as an attacker does not need any information on the encodings used in U and V, he/she is able to perform the action. A second modification that an attacker can realize includes rearranging the output and input bits of a table. The output bits of table U that form input bits of table V can be given a different order by the attacker. This change in the order of the bits is undone in table V. These potential changes that an attacker may apply impose the threat of deleting the watermark from the network of look-up tables.

It was shown above that an attacker might modify an network of look-up tables containing a watermark. In this context, the following issues play a role in providing a robust watermark. First, how to make multiple white-box AES implementations $X_1, X_2, \ldots, X_n$ that are all functionally equivalent, i.e., that all implement AES for a given key K. Second, it helps to identify what kind of modifications it is assumed that an attacker u might perform on an implementation $X_u$, in his attempt to remove the watermark and still have the desired functionality. Third, let Y be a modified white-box implementation that is obtained from a white-box implementation $X_u$ by (possibly) applying such modifications. It is desirable to still be able to determine that Y has been derived from $X_u$ and not from any other implementation $X_i$? These three issues may be referred to as the forensic watermark issues.

In an embodiment, the watermark is added in such a way that the watermark can be recovered even if an attacker has changed one or more of the nibble encodings and/or has changed the order of the bits flowing from one table to the next table. More generally, an attacker may have applied any transformation on a set of output bits of a table that form input bits to the same next table. One way to realize this may be better understood by means of the following mathematical theory.

The Equivalence Problem

The following notions are used. A nibble is a 4-bit vector, a byte is an 8-bit vector, and each (4n)-bit vector x is assumed to be partitioned into n nibbles as $x = (x_1, \ldots, x_n)$, for nibbles $x_1, \ldots, x_n$. A (4n)-bit vector x thus partitioned may be referred to as a nibble vector of length n. A nibble transformation is a map $f = (f_1, \ldots, f_n)$, where each $f_i$ is a nibble map, that is, mapping nibbles to nibbles; such a map applies to (4n)-bits vectors $x = (x_1, \ldots, x_n)$ partitioned into nibbles as above and maps such a vector x onto $$f(x) = (f_1(x_1), \ldots, f_n(x_n)).$$

Note that such a nibble transformation f is invertible if and only if each of the nibble maps $f_i$ is invertible. Invertible nibble transformations are used at the output of lookup tables, where they function as output nibble encoding, or at the input of a lookup table, where they then function as an input nibble decoding. A nibble permutation is a permutation $\pi = (\pi_1, \ldots, \pi_n)$, where $\{\pi_1, \pi_2, \ldots, \pi_n\} = \{1, 2, \ldots, n\}$, which is assumed to act on (4n)-bits vectors $x = (x_1, \ldots, x_n)$ by permuting its nibbles; such a it is assumed to map x to $$\pi(x) = (x_{\pi_1}, x_{\pi_2}, \ldots, x_{\pi_n}).$$

The operation O realized by a type-II table 200 transforms an input byte $a = (a_1, a_2)$ consisting of two nibbles $a_1, a_2$ into a 32-bit output vector $z = (z_1, \ldots, z_8)$ consisting of eight nibbles $z_1, \ldots, z_8$, and takes the form $$O = f \circ B \circ C \circ T \circ A \circ g, \qquad (1)$$

where the various operations have the following form.

The map $g = (g_1, g_2)$ represents a nibble decoding 202 on the incoming byte $a = (a_1, a_2)$ and maps a onto $(g_1(a_1), g_2(a_2))$; here each $g_i$ is an invertible map from nibbles to nibbles.

The map A represents a nonsingular linear map 204 from bytes to bytes.

The map T represents a "T-box operation" 206 mapping bytes to bytes.

The map C represents a part of the mixing operation 208, and consists of a linear map from bytes to 32-bit vectors.

The map B is the mixing bijection 210. It maps 32-bit vectors to 32-bit vectors. In an embodiment, this map B is used to encode the watermark.

Finally, $f = (f_1, \ldots, f_8)$ represents a nibble encoding 212, mapping a 32-bit vector $u = (u_1, \ldots, u_8)$ partitioned into nibbles $u_1, \ldots, u_8$ into the output vector $z = (z_1, \ldots, z_8) = (f_1(u_1), \ldots, f_8(u_8))$.

If $a^{(1)}, \ldots, a^{(4)}$ are the four input bytes that contribute to an output column b then there are four type-II tables $O^{(1)}, \ldots, O^{(4)}$ involved, of the form $$O^{(i)} = f^{(i)} \circ B \circ C_i \circ T_i \circ A_i \circ g^{(i)}. \qquad (2)$$

Then the output column b satisfies $$b = (f^{(1)})^{-1} z^{(1)} + (f^{(2)})^{-1} z^{(2)} + (f^{(3)})^{-1} z^{(3)} + (f^{(4)})^{-1} z^{(4)}, \qquad (3)$$

where $$z^{(i)} = O^{(i)} a^{(i)}.$$

Note that the 32×32 matrix $C = [C_1 C_2 C_3 C_4]$, where the $C_i$ are those in (2), represents the full mixing operation.

The operations required for (3) are implemented by a few layers of type-IV tables. Here, the operation A realized by a type-IV table 400 transforms a pair of nibble inputs (x, y) into a nibble z and takes the form $$A = f \circ S \circ g, \qquad (4)$$

where the various operations have the following form.

The map $g = (g_1, g_2)$ represents a nibble decoding 402 on the incoming pair of nibbles $(x, y)_5$ mapping them onto $(g_1(x), g_2(y))$; here each g is an invertible map from nibbles to nibbles.

The map S represents the 4-bit XOR operation $\oplus$ in 404.

Finally, f represents a nibble encoding 406, mapping a nibble u into a nibble f(u).

So to realize the sum for the output column b in (3), first each of the 32-bit summands $z^{(i)}$ of table $O^{(i)}$ is partitioned into eight nibbles $z_j^{(i)}$, for $j=1, \ldots, 8$. Then nibble $b_j$ of the output column b is computed by two layers of type-IV tables as $$b_j = [(f^{(1)})^{-1} z_j^{(1)} \oplus (f^{(2)})^{-1} z_j^{(2)}] \oplus [(f^{(3)})^{-1} z_j^{(3)} \oplus (f^{(4)})^{-1} z_j^{(4)}]. \quad (5)$$

As a consequence of the final output encodings in each of the type-IV tables in the last layer, this part of the lookup table network actually computes $c=h(b)$, for some output nibble encoding h.

An attacker wishing to hide its forensic watermark B has a number of possibilities to manipulate the output vector $c=h(b)$. First, permuting the nibbles in the vectors $z^{(i)}$ each by the same permutation it has the effect that the nibbles in the output vector are also permuted by it. Secondly, changing the output nibble encodings of the last layer of type-IV tables (in an invertible way) effectively applies this encodings to the nibbles of c. Note that the attacker can undo both these operations by first permuting the successor networks to which the bytes of c are fed.

So the attacker can ensure that instead of output $c=h(b)$, the actual output produced is $$b' = \pi \circ f \circ b, \quad (6)$$

where $$\pi = (\pi_1, \ldots, \pi_8)$$

is an unknown invertible nibble permutation, and $$f = (f_1, \ldots, f_8)$$

is an unknown invertible nibble transformation, so that $b' = (b_1', \ldots, b_8')$ satisfies $$b'_{\pi^{-1}(i)} = f_i(b_i). \quad (7)$$

Given a (imaginary) non-obfuscated (standard) AES implementation of the system that is realized here in the present table lookup network, all intermediate results of computations can be inspected, and even set to certain predetermined values by a decryption-type operation. In particular, all intermediate results $$x^{(i)} = C_i \circ T_i \circ A_i \circ g^{(i)}(a^{(i)})$$

in the computation performed in table $O^{(i)}$, which also occur in a standard AES computation, and hence also their sum $$x = x^{(1)} + x^{(2)} + x^{(3)} + x^{(4)},$$

can be set to any predetermined value, irrespective of the actions of the attacker. Since $$z^{(i)} = f^{(i)} x^{(i)},$$

it follows from (3) that $$b = Bx. \quad (8)$$

However, as a result of the manipulations of the attacker (and of the original nibble output encoding), instead of b the vector b' obtained from b as in (6) is observed, with unknown but fixed nibble permutation it and nibble transformation f.

As a consequence, the input/output behavior of the unknown map T can be observed, which, however, is known to be of the form $$T = \pi \circ f \circ B, \quad (9)$$

with unknown nibble permutation it, invertible nibble transformation f, and invertible linear map B representing the (unknown) watermark, from which information about the original forensic watermark B is desired.

Say that two 32×32 invertible matrices (or forensic watermarks) B and B' are equivalent if there are nibble permutations $\pi$, $\sigma$ and invertible nibble transformations f,g such that the two operations $$T' = \rho \circ f \circ B, \quad T' = \sigma \circ g \circ B'$$

are equal. As a consequence of this definition, in the above model it is obviously not possible to distinguish between equivalent forensic watermarks.

For later use, first a necessary and sufficient condition for matrices to be equivalent is derived. To this end, a few lemmas are derived. The first lemma states roughly speaking that the order of a nibble permutation and a nibble transformation can be interchanged. The second lemma investigates when a nibble permutation followed by a nibble transformation can be a linear map.

Lemma 1. Let it be a nibble permutation and let $f = (f_1, \ldots, f_8)$ be an invertible nibble transformation. Then $\pi \circ f = f^\pi \circ \pi$, where $$f^\pi = (f_{\pi(1)}, \ldots, f_{\pi(8)}).$$

Proof: If $x = (x_1, \ldots, x_8)^T$ is any 32-bit vector, with nibbles $x_1, \ldots, x_8$, then the vector $y = \pi \circ f(x)$ satisfies $$y_i = f_{\pi(i)} x_{\pi(i)},$$

for all i. Now $\pi(x) = (x_{\pi(1)}, \ldots x_{\pi(8)})$, and hence $f^\pi \circ \pi(x) = y = \pi \circ f(x)$, for all vectors x. □

Lemma 2. Let $\tau$ be a nibble permutation, let $h = (h_1, \ldots, h_8)$ be an invertible nibble transformation, and let K be an invertible linear map such that $\tau \circ h = K$. Assume that the matrix K of this map is partitioned into 4×4 submatrices $K_{i,j}$, for i, $j=1, \ldots, 8$. Then each $h_i$ is an invertible linear map on nibbles; moreover, for each j, we have that $K_{i,j} \neq 0$ if and only if $\tau(i) = j$.
Proof: Let $K = (K_1 \ldots K_8)^T$ be partitioned into eight 4×32 matrices $K_1, \ldots, K_8$. Now if $x = (x_1, \ldots, x_8)^T$ is any 32-bit vector, with nibbles $x_1, \ldots, x_8$, then the vector $y = \tau \circ h(x) = Kx$ satisfies $$y_i = h_{\tau(i)} x_{\tau(i)} = K_i x, \quad (10)$$

for all i. Next, let j be arbitrary, and let $j = \tau(s)$, say. Suppose that the matrix $K_s = (K_{s,1} \ldots K_{s,8})$ is partitioned into 4×4 submatrices $K_{s,1}, \ldots, K_{s,8}$. Now if $x_i = 0$ for all $i \neq j$, and $x_j = z$ is arbitrary, then from (10) it follows that $$y_s = h_j(z) = K_{s,j} z;$$

as a consequence, $$h_j = K_{\tau^{-1}(j), j}$$

is a linear map, which is nonzero since it is invertible. Moreover, by letting $x_s = z$, $x_r = u$, and $x_i = 0$ for all $i \neq r, s$, with z,u arbitrary, it follows that $K_{i,j} = 0$ for all $i \neq \tau^{-1}(j)$. □
From these two lemmas the following can be obtained.
Theorem 3. Let $N = (N_1 \ldots N_8)^T$ and $M = (M_1 \ldots M_8)^T$ be two matrices, each partitioned into size 4×32 submatrices $N_1, \ldots, N_8$ and $M_1, \ldots M_8$. Then N and M are equivalent if and only if there are a nibble permutation v and a collection $L_1, \ldots, L_8$ of invertible 4×4 matrices such that $$N_{\nu(i)} = L_i M_i,$$

for $i = 1, \ldots, 8$.
Proof: Suppose that M and N are equivalent. Then there are nibble permutations $\pi, \sigma$, and invertible nibble transformations f,g such that $$\pi \circ f \circ N = \sigma \circ g \circ M.$$

As a consequence, $$NM^{-1} = f^{-1} \circ \pi^{-1} \circ \sigma \circ g.$$

Using Lemma 1, $f^{-1} \circ \pi^{-1} \circ \sigma \circ g$ can be written as $\tau \circ h$, for a suitable nibble permutation $\tau$ and invertible nibble transformation $h$. Then for the linear map $K=NM^{-1}$ it holds that $$K=\tau \circ h;$$

hence, by Lemma 2, the maps $L_j=K_{\tau^{-1}(j),j}$ are invertible and $K_{i,j}=0$ when $\tau(i)\neq j$. As a consequence, we have that $$N_i = \sum_{j=1}^{8} K_{i,j} M_j = K_{i,\tau(i)} M_{\tau(i)};$$

writing $j=\tau(i)$ and $V=\tau^{-1}$, we obtain that $$N_{v(j)}=L_j M_j.$$

Conversely, it is easily seen that the two matrices $N$ and $M$ are indeed equivalent if the condition holds. □

Corollary 4. Let the invertible matrix $N$ be partitioned into size $4\times 4$ submatrices $N_{i,j}$, for $i,j=1, \ldots, 8$. Then $N$ is equivalent to the size $32\times 32$ identity matrix $I$ if and only if in each nibble row and in each nibble column precisely one submatrix $N_{i,j}$ is nonzero.

Proof: Immediate consequence of Theorem 3. □

In the assumed attacking model, the attacker can transform its watermark, a size $32\times 32$ matrix, into an equivalent matrix, but into no others. Theorem 3 can be used to estimate the maximum number of matrices equivalent to any given one, and hence to estimate the minimum number of essentially distinct forensic watermarks. To this end, let $N_{inv}(n)$ denote the number of invertible size $n\times n$ (binary) matrices. As is well known and easily seen, $$N_{inv}(n)=(2^n-1)(2^n-2)(2^n-4) \ldots (2^n-2^{n-1}); \quad (11)$$

as a consequence, $$N_{inv}(4)=(16-1)(16-2)(16-4)(16-8). \quad (12)$$

Also, the number of permutations on eight nibbles is $8!=8\cdot 7\cdot 6\cdot 5\cdot 4\cdot 3\cdot 2\cdot 1$. The following is a consequence of Theorem 3.

Theorem 5 The number $N_{eq}(M)$ of matrices equivalent to a given size $32\times 32$ matrix $M$ satisfies $$N_{eq}(M)\leq N_{inv}(4)^8 8!.$$

Proof: Indeed, by Theorem 3, each such matrix $N$ is determined by a nibble permutation $\tau$, of which there are $8!$, and eight invertible size $4\times 4$ matrices $L_1, \ldots, L_8$, for each of which there are $N_{inv}(4)$ choices. □

Corollary 6 There are at least $$N_{inv}(32)/(N_{inv}(4)^8 8!) \approx 5 \cdot 10^{268}$$

inequivalent invertible size $32\times 32$ (binary) matrices (inequivalent watermarks).

Next, given that $N$ forensic watermarks $M_1, \ldots, M_N$ have been handed out, suppose that an attacker has changed his watermark into an equivalent watermark $N$. In order to establish the original watermark of the attacker, it was noted above that it is possible to observe the input/output behavior of a map $T$ that is known to be of the form $$T=\pi \circ f \circ N, \quad (13)$$

but with unknown nibble permutation $\pi$, invertible nibble transformation $f$, and invertible matrix $N$. In order to identify the attacker, one needs to be able to test whether or not the matrix $N$ in (13) is equivalent to a given matrix $M$. First note that without loss of generality it may be assumed that $M=I$, the identity matrix. Indeed, if necessary instead of $T$ the operation $T'=T\circ M^{-1}$ can be investigated, which is of the form $$T'=\pi \circ f \circ (NM^{-1});$$

it is obvious from the definition that $N$ is equivalent to $M$ if and only if $NM^{-1}$ is equivalent to $I$.

In the following, a procedure is outlined to test whether or not a given map $T=\pi \circ f \circ N$ has $N$ equivalent to $I$. In that respect, the task is to produce a number of 32-bit input vectors $x_1, \ldots, x_m$ such that inspection of the output vectors $y_i=T(x_i)$ for $i=1, \ldots, m$ is sufficient to decide if $N$ is equivalent to $I$ or not. Below, it will be explained how to test equivalence if the number $m$ of input vectors used is at least 32.

Let $m=33$. For $j=1, \ldots, 32$, take $x_j=e_j$, where $e_j$ denotes the $j$-th unit vector, having a "1" in the $j$-th bit and a "0" in all other bits. Finally, take $x_{33}=0$, the all-zero vector. Write $y_j=T(e_j)$ to denote the $j$-th output vector for $i=1, \ldots, 32$, and write $c=T(0)$ to denote the last output vector. Suppose $c=(c_1, \ldots, c_8)^T$ has nibbles $c_1, \ldots, c_8$. For $i=1, \ldots, 8$, let $C_i$ denote the size $4\times 4$ matrix with all its columns equal to $c_i$.

Now consider the size $32\times 32$ matrix $Y$ which has the vector $y_j$ as its $j$-th column, for $j=1, \ldots, 32$. Partition $Y$ into size $4\times 4$ submatrices $Y_{i,j}$. Now if (a) in each nibble row $i$ all but one of the submatrices $y_{i,s}$ are equal to $C_i$, and (b) in each nibble column $j$ all but one of the submatrices $Y_{r,j}$ are equal to $C_r$, then $N$ is equivalent to $I$. Conversely, if this is not the case, then $N$ is not equivalent to $I$. (In fact, if it is known that $N$ is invertible, then testing only for (b) is enough, since then (b) implies (a).)

This is explained as follows. Partition the 32 bit positions into eight nibble position sets $J_1=\{1,2,3,4\}, \ldots, J_8=\{29,30,31,32\}$. Partition $N$ into size $4\times 4$ submatrices $N_{i,j}$, for $i,j=1, \ldots, 8$. First, suppose that $N$ is equivalent to $I$. According to Corollary 4, $N$ is equivalent to $I$ if in each of the eight nibble rows and in each of the eight nibble columns precisely one submatrix $N_{i,j}$ is nonzero. So there exists a permutation $\tau$ such that $N_{i,j}$ is nonzero precisely when $\tau(i)=j$. Note that if in each of the eight nibble columns precisely one submatrix $N_{i,j}$ is nonzero, then either the same statement holds for nibble rows, or there is a nibble row where all the submatrices are zero; the second possibility cannot occur if $N$ is invertible.

First, consider $c=T(0)$. Obviously, $N(0)=0$, so $c=\rho \circ f(0)$, hence $c_i=f_{\pi(i)}(0)$ for all $i$.

Next consider some $r$ contained in nibble set $J_j$, say $r=4j+s$, for some $s$ in $\{1, \ldots, 4\}$. Then $Ne_r=z_r=(z_{r,1}, \ldots, z_{r,8})^T$, with $z_{r,i}$ equal to the $s$-th column of $N_{i,j}$; as a consequence, $z_{r,i}=0$, the four-bit all-zero vector, except possibly when $\tau(i)=j$. Then the $r$-th output vector $y_r=(y_{r,1}, \ldots, y_{r,8})=\pi \circ f(z_r)$ satisfies $$y_{r,i}=f_{\pi(i)}(z_{r,\pi(i)}).$$

So $y_{r,i}=f_{\pi(i)}(0)=c_i$, except possibly when $\tau(i)=j$. This holds for all $r$ in $J_j$; so since $y_{r,i}$ is the $s$-th column of the submatrix $Y_{i,j}$, it follows that $$Y_{i,j}=C_i,$$

except possibly when $\tau(i)=j$.

Conversely, suppose that $N$ is not equivalent to $I$. Then there is a nibble column, say column $j$, that contains two nonzero submatrices, say in nibble rows $i_1$ and $i_2$ with $i_1 \neq i_2$. So there are columns $s_1, s_2$ in $1, \ldots, 4$ such that both column $s_1$ in $N_{i_1,j}$ and column $s_2$ in $N_{i_2,j}$ are nonzero. Now let $r_1=8j+s_1$, $r_2=8j+s_2$ (both in nibble position set $j$) and consider the two vectors $Z_{r_t}=Ne_{r_t}$. Now if $Z_{r_t}=(z_{r_t,1}, \ldots, z_{r_t,8})$, then both nibbles $z_{r_1,i_1}$ and $z_{r_2,i_2}$ are nonzero, and hence $f_{i_t}(z_{r_t,i_t}) \neq c_{\pi^{-1}(i_t)}$ for $t=1, 2$. As a consequence, nibble $\pi(i_t)$ of output vector $y_{r_t}$ is not equal to $c_{i_t}$, for $t=1, 2$, and hence the matrix $Y$ has not the desired form.

The following represents a simple formulation of the above procedure. First, compute $c=(c_1, \ldots, c_8)$ as $c=T(0)$. Next, for each nibble $j=1, \ldots, 8$, compare the images $u_1, \ldots, u_4$ of the four unit vectors $e_{8j+1}, \ldots, e_{8j+4}$ under T to c. Now there should be a unique nibble number $\tau(j)$ such that the vectors $u_1, \ldots, u_4$ differ from c only in nibble $\tau(j)$. If this is the case for each j, then N is equivalent to I, if not, then N is not equivalent to I.

This procedure is almost optimal. Indeed, the next theorem shows that at least 32 input vectors are needed to determine equivalence.

Theorem 7. Let $x_1, \ldots, x_{31}$ be any 31 input vectors. Then there exists a size 32×32 matrix N not equivalent to I such that $Nx_i=x_i$ for all i.

Proof: Let b denote a nonzero vector orthogonal to all vectors $x_i$ (there must be such a vector since the dimension of the whole space is 32) and let $H=b^\perp$. Let v be a vector with $(b,v)=1$; so $v \notin H$. Finally, let $w \notin H$ be a second vector outside H, with $w \neq v$. So $(b,w)=1$, and hence $(b,v-w)=0$, that is, $v-w \in H$. Consider the linear invertible map N that maps $h \in H$ onto itself (so N acts as the identity on H) and maps v onto w. It holds that $$N=I+[\beta_1(w-v) \ldots \beta_{32}(w-v)], \quad (14)$$

where $b=(\beta_1, \ldots, \beta_{32})$ is made up of bits $\beta_i$. Indeed, if $x=(x_1, \ldots, x_{32})$, then $$N_x = x + [\beta_1(w-v) \ldots \beta_{32}(w-v)]x$$
$$= x + (x_1\beta_1 + \ldots + x_{32}\beta_{32})(w-v)$$
$$= x + (x, b)(w-v),$$

hence $Nx=x$ for $X \in H$ and $Nv=v+(v,b)(w-v)=v+(w-v)=w$.

The last step is to show that it is possible to choose w outside H such that N, with matrix as in (14), is not equivalent to I. To this end, let $v=(v_1, \ldots, v_8)$ for nibbles $v_1, \ldots, v_8$, and let $b=(b_1, \ldots, b_8)$ for nibbles $b_1, \ldots, b_8$. Now distinguish two cases.

If $b_j \neq 0$ for some $j \neq 1$, then take $w=(w_1, \ldots, w_8)$ with $w_i=v_i$ for $i \neq j$ and $w_j=v_j+u_j$, for some nibble $u_j \neq 0$ with $(u_j,b_j)=0$. Then $w-v=u=(u_1, \ldots, u_8)$ with $u_i=0$ for $i \neq j$ and $u_j \neq 0$.

If $b_2=\ldots=b_8=0$, then $b_1 \neq 0$. Now take $w=(w_1, \ldots, w_8)$ with $w_i=v_i$ for $i \neq 2$ and $w_2 \neq v_2$. Again $w \neq v$ and $(w,b)=(w_1,b_1)=(v_1,b_1)=(v,b)=1$, so $w \notin H$.

In both cases, the first nibble column of N is nonzero both in nibble row 1 and in nibble row $j \neq 1$ (in the first case) or in nibble row 2 (in the second case), and hence in both cases N is not equivalent to I by Corollary 4. Conclusion: Possibly N=I, and hence N≡I. But it is also possible that N=T (consider the case that $\pi$ and f are identity). □

Testing Equivalence

Assume that a map T is of the form $T=\pi \circ f \circ N$ for some unknown nibble permutation $\pi=(\pi_1, \ldots, \pi_8)$, invertible nibble transformation $f=(f_1, \ldots, f_8)$, and invertible size 32×32 linear transformation N. Assume furthermore that given any input vector x it is possible to compute the output vector $y=T(x)$. Then the following algorithm decides whether or not N is equivalent to any given invertible size 32×32 linear transformation M. (Here 0 denotes the 32-bits all-zero vector, and $e_i$ denotes the 32-bit i-th unit vector with an "i" in bit i and zeroes in all other bits.)

```
equivalent := true;
int array[1:32]   c:=T(0);
int r:=1;
while (r≤8 and equivalent) do
begin
        int n:=0;    //nibble number known to differ
        int s:=1;    //testing image of vector e_{4r+s}
        while (s≤4 and equivalent) do
        begin
                int array [1:32]   d:=T(M^{-1}e_{4r+s})-c;
                if (d=(d_1,...,d_8) has more than one nonzero
nibble)
                        or
                        (n≠0 and d_m≠0 and m≠n)
                then begin equivalent := false; break; end;
                if (d_m≠0) then n:=m; //nibble number n
differs
                s:=s+1;
        end;
        r:=r+1;
end
//here M ≡ N if and only if equivalent=true.
```

Creating Inequivalent Watermarks

Consider the collection {W} consisting of all size 32×32 binary matrices W, which, when partitioned into size 4×4 submatrices $W_{i,j}$, for $j=1, \ldots, 8$, have the following properties:

The block W is the all-zero matrix whenever $i>j$.
All blocks W are size 4×4 identity matrices.

So any matrix $W \in \{W\}$ is invertible and has the form $$W = \begin{pmatrix} I & W_{1,2} & W_{1,3} & W_{1,4} & W_{1,5} & W_{1,6} & W_{1,7} & W_{1,8} \\ O & I & W_{2,3} & W_{2,4} & W_{2,5} & W_{2,6} & W_{2,7} & W_{2,8} \\ O & O & I & W_{3,4} & W_{3,5} & W_{3,6} & W_{3,7} & W_{3,8} \\ O & O & O & I & W_{4,5} & W_{4,6} & W_{4,7} & W_{4,8} \\ O & O & O & O & I & W_{5,6} & W_{5,7} & W_{5,8} \\ O & O & O & O & O & I & W_{6,7} & W_{6,8} \\ O & O & O & O & O & O & I & W_{7,8} \\ O & O & O & O & O & O & O & I \end{pmatrix}. \quad (15)$$

Any two distinct matrices from {W} are not equivalent. To see this, use Theorem 3. Let N,M be two equivalent matrices from {W}. Then there exist a nibble permutation $\tau$ and invertible size 4×4 matrices $L_1, \ldots L_8$ such that $N_{\tau(i)}=L_iM_i$ for $i=1, \ldots, 8$. Now since M and N are in {W}, nibble row i of M and N start with precisely i−1 all-zero blocks followed by a block I; also $L_iM_i$ starts with precisely i−1 all-zero blocks followed by some nonzero block $L_i$. As a consequence, the nibble row number i can be uniquely identified from both $N_i$ and $L_iM_i$. Hence the permutation $\tau$ must be the identity, each $L_i$ must be the identity matrix, and N=M. Note that {W} contains $(2^{16})^7+6+\ldots+1=2^{448}>10^{134}$ matrices. Differently watermarked versions may be created by selecting different ones of the matrices from {W}.

An alternative way of creating watermarks in different equivalence classes comprises randomly selecting a linear transformation N, and using the algorithm for equivalence detection to verify whether the selected N is equivalent to any previously selected linear transformation.

It is noted that in the foregoing, the emphasis has been on some special cases of networks of look-up tables and their obfuscation and watermarking. It will be appreciated that the principle of watermarking can be applied independently of the properties of these special cases. For example, AES has been used as the main carrier to explain white-box implementations using encodings and mixing bijections. However, the skilled person will appreciate that AES, encodings, and mixing bijections are not essential to the application of a watermark to a network of look-up tables.

Figure 10:
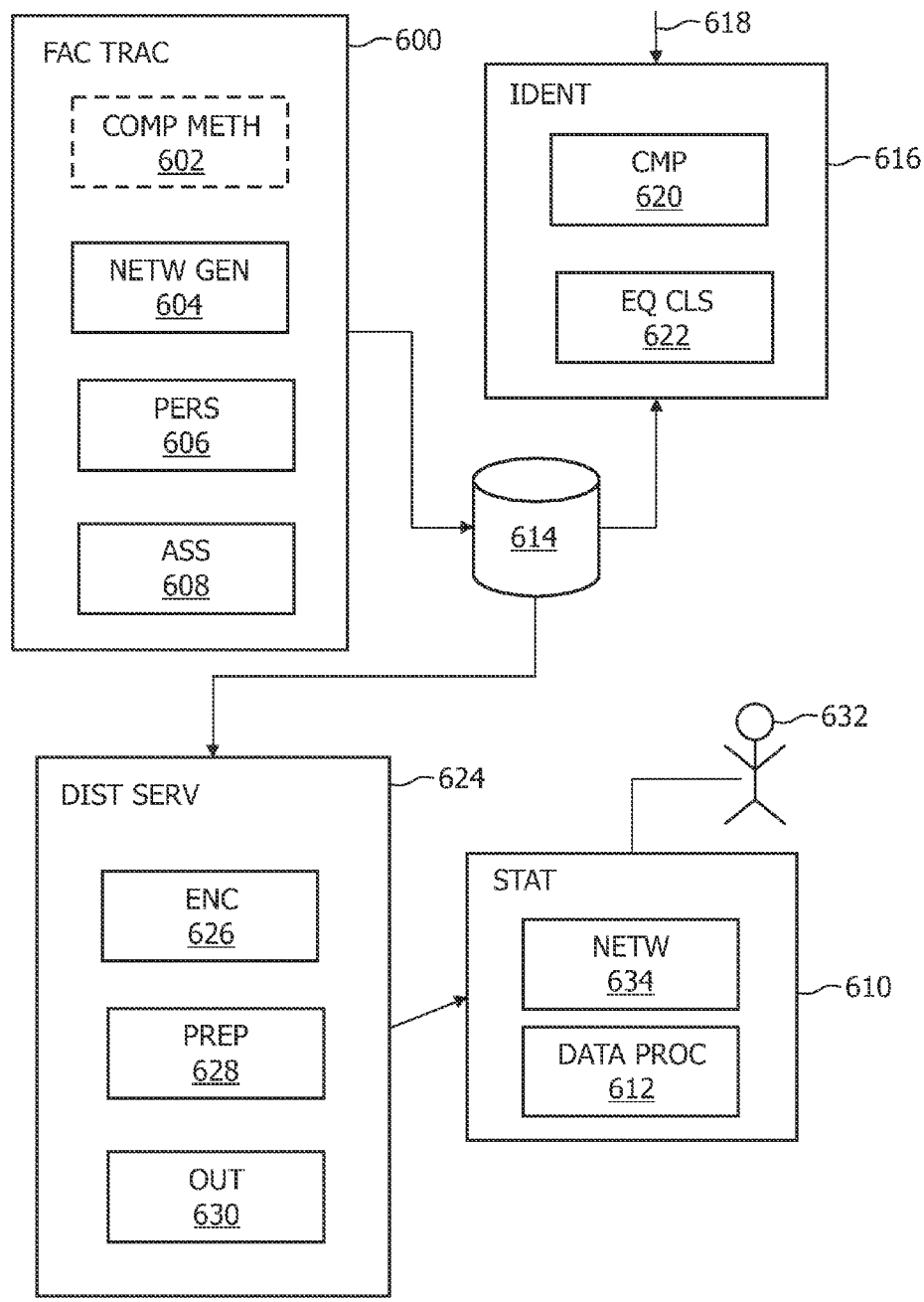
FIG. 10 is a diagram illustrating an embodiment.

FIG. 10 illustrates an embodiment of the invention. The Figure shows a system 600 for facilitating tracing users of copies of an implementation of a computational method 602. Users 632 of the computational method 602 may have stations 610 on which their implementations reside, in which case the respective users may be unified with their respective stations. Alternatively the users may have different IP addresses or may log in to a system from which they obtain the implementation using their own login ID and password. Objects such as versions of a network of look-up tables may thus be associated with a user or a station by reference to for example the IP address or login ID. Other distribution systems and ways to associate objects with stations or their users will be apparent to the skilled person. The system 600 may be realized in hardware and/or software. For example it can be a software module running on a server at a content provider. The system 600 is arranged for preparing an implementation of a computational method 602 for distribution to at least one of the users 632 (or stations 610). To that end, the system 600 comprises a network generator 604 for generating a network of look-up tables representing steps of the computational method. For example, the network of look-up tables takes the form of the white-box implementation explained above in relation to FIGS. 1-9. However, other ways to generate such a network of look-up tables for a given computational method are in reach of the skilled person and may be applied.

The system 600 further comprises a personalizer 606. The personalizer generates a plurality of different versions of the network of look-up tables. It does this by changing at least one value in the network of look-up tables. An end result of a computation that may be performed by means of the different versions of the network of look-up tables is substantially the same for the different versions of the network of look-up tables, in particular for a relevant domain of input values. The relevant domain of input values corresponds for example to values that need to be processed in a day-to-day usage of the implementation according to its specifications. The changes can be made in different ways. For example, a first look-up table may be changed by exchanging pairs of output values of the look-up table. To maintain the same output values of the network, entries of at least one next table in the network of look-up tables may be exchanged to undo the change made to the first look-up table. Depending on the structure of the network of look-up tables, it is possible to make changes to a single look-up table without changing the output values of the network as a whole. The network may also be extended with additional look-up tables or rearranged, as long as the result for the relevant domain of input values remains substantially unchanged.

The system 600 also comprises an associator 608. The associator associates the created different networks with users or stations stored in database 614 by means of their IP address, login ID, or any other kind of tag. The generated networks of look-up tables that have been associated with a user are stored in the database 614.

In an embodiment, the computational method is characterized by a cryptographic scheme, for example AES. Other cryptographic schemes such as DES, and other cryptographic schemes suitable for digital rights management, will be apparent to the skilled person. The cryptographic scheme works together with a cryptographic key. The personalizer is arranged for generating a plurality of versions of the network of look-up tables that all implement the same cryptographic scheme with the same key. This way, a plurality of users may encrypt or decrypt data using the same cryptographic scheme and key. At the same time, the individual versions of look-up tables are unique so that from a version of the look-up tables, it is possible to find out who is the user associated with the version. This is particularly interesting for broadcasting systems, wherein a large number of users is provided with the same broadcasted data. The broadcasted data is encrypted and all users need to apply the same cryptographic scheme and key for decrypting the broadcasted data. The personalizer for example generates different white-box implementations of the cryptographic scheme.

In an embodiment, the personalizer is arranged for creating white-box implementations of the computational method. Examples of white-box implementations are given above. They may be created for in principle any computational method. The personalizer 608 is arranged for changing values in the look-up tables, in such a way that the end result is not changed. For example the nibble encodings or one or more of the mixing bijections may be changed. Alternatively or additionally, the structure of the network may be changed, i.e., the way in which data flows through the network may be changed. Individual look-up tables may be added to or removed from the network of look-up tables.

In an embodiment, the personalizer is arranged for obfuscating the white-box implementations by means of a linear or nonlinear operator. This operator is integrated in a first plurality of look-up tables in the network and an inverse of the operator is integrated in a second plurality of look-up tables in the network. Different operators are used in different versions. This means that, when an attacker wants to remove all traces of the selected operator, he needs a great deal of insight in the complex mutual dependencies of the first and second pluralities of look-up tables. One or more of these tables may have input and/or output encodings. This makes it harder to find out the operator used and, when these input and output encodings are selected differently for different versions, add more characteristic properties to the watermark. When applied to the AES example, the operator may be the mixing bijection and the input/output encodings may be the nibble encodings.

Preferably the personalizer is arranged for creating versions using operators in different equivalence classes, where an equivalence class comprises operators of which the corresponding networks of look-up tables can be obtained from each other by applying modifications to the input and/or output encodings. The input and/or output encodings are easily changed by an attacker, therefore it is needed to select the different operators such that they can still be distinguished from each other after changes to these encodings. The equivalence classes described in the section entitled "The equivalence problem" are examples hereof.

More generally, personalizer 606 is arranged for creating versions in different equivalence classes, where an equivalence class comprises versions that can be obtained from each other by applying modifications to the version from a set of modifications assumed to be in reach of an attacker. This may be realized by randomly applying modifications to generate a version, and then verifying whether it belongs to an equivalence class of a previously generated version. If it turns out that a version in the same equivalence class has already been generated, the newly generated version is discarded and a another version is generated to replace the discarded version. Alternatively, the personalizer 606 is arranged for selecting (pseudo-)randomly one of the matrices W ∈ {W} according to Equation (15).

An embodiment comprises a distribution server 624. The distribution server 624 takes a version associated with a user 632 from the database 614 and provides the version to that user 632 or to his station 610. To make sure only the intended recipient receives the version, it is encrypted with a user specific key. Content (for example, audio data, video data, software, etc.) is encrypted with the cryptographic scheme and cryptographic key that was implemented in the version of the network of look-up tables. The encrypted version and the content are transmitted to the station 610 of the user 632. It will be appreciated that this is only one embodiment of a distribution method. The personalized versions may be distributed in any way, encrypted or not encrypted, completely or in part. They can be distributed via a network (e.g. Internet) or via a storage medium (e.g. CD). One way of securely distributing the versions is by sending only a portion of the network of look-up tables via the distribution channel. This portion can be the type II tables 20 (with the corresponding type IV tables 22). The type III tables 24 with their corresponding type IV tables 26 may be provided to the station in a different way, for example by means of a smart card. This strengthens the association between the watermark and the user, as the watermark may be fully or partly defined by the portion of the look-up tables that is present in the smart card.

An embodiment comprises a station 610. The station 610 comprises an input for receiving a network of look-up tables representing steps of a computational method. The network may be encrypted with a user specific key, in which case it is first decrypted. The network is received from distribution server 624. The station 610 comprises a data processing unit 612 for applying the network of look-up tables 634 to process data. The data is for example audio or video content provided for example from the distribution server 624 or from a CD-ROM. The network of look-up tables has a watermark applied to it by the system 600. Although the network of look-up tables received from server 624 is thus in principle unique, it is possible that another network of look-up tables is provided to the input of the station 610, for example by an attacker. That other network of look-up tables may provide more or different functionality than the network of look-up tables received from the distribution server 624. Although the station then may have the functionality of that other version of the network of look-up tables, it is possible to trace the origin of the version of look-up tables, because it has unique properties and is associated to the originating user or station.

An embodiment comprises a system 616 for identifying a copy of an implementation of a computational method. The system 616 is connected to a database 614 comprising different versions of these implementations. One or more networks of look-up tables (referred to hereafter as input versions) are provided to input 618 of the system 616 for matching against the versions stored in the database 614. Each implementation comprises a network of look-up tables representing steps of the computational method. The system 616 comprises a comparator 620 for comparing the look-up table in the implementation with at least one of the versions. The comparator can be realized by a byte-to-byte comparison, that may report whether the input version matches the version in the database. It may also report a degree of similarity between the input version and the version in the database. It may also find a version in the database 614 that is most similar to the input version.

The system 616 may comprise an equivalence class establisher 622 to establish an equivalence class to which the input version belongs, and identify one or more versions in the database having that same equivalence class. An equivalence class preferably includes all versions that can be transformed in one another by applying modifications to the version from a set of modifications assumed to be in reach of an attacker.

Figure 11:
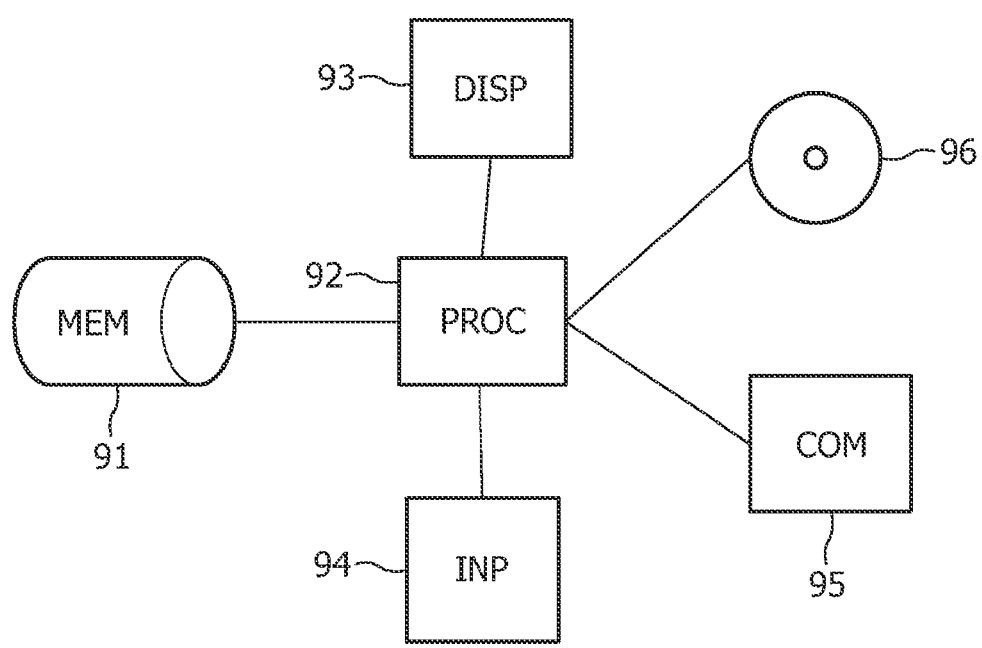
FIG. 11 is a diagram illustrating an embodiment.

FIG. 11 illustrates an embodiment of the invention that can be implemented in, for example, a server of a content provider. It can also be implemented in a standard PC. The Figure shows a communication port 95 for providing information such as a version of a network of look-up tables and/or content to be processed. The communication port 95 is arranged for connection to, for example, the Internet. The version of the network of look-up tables may also be stored on a storage medium 96 such as a DVD or CD. The Figure further shows a processor 92 and memory 91. The memory comprises instructions for causing a processor to generate a plurality of versions of the network of look-up tables in the way set forth. The network of look-up tables represents a steps of a computational method, for example a cryptographic scheme with a particular cryptographic key. In memory 91, the individual versions that are generated are associated with individual users, for example by means of a table. The Figure also shows an input 94 such as a keyboard and/or mouse, and a display 93 for operating the system by an operator.

Another embodiment may also be explained with reference to FIG. 11. This embodiment comprises a station, for example a personal computer, a set-top box, digital video player, terminal, or smart card. The station comprises a communications port 95 for connecting to a server for obtaining a version of a network of look-up tables associated with a user. In addition or alternatively, the station comprises means for reading a storage medium 96, such as CD or DVD, on which the version of the network of look-up tables may be stored. The station comprises a processor 92 for processing data by applying the network of look-up tables. The data may also be obtained via communications port 95 and/or storage medium 96. For example, the network of look-up tables represents steps of a computational method. The computational method may comprise any data processing method. For example, one or more processing steps of a video enhancement algorithm such as PixelPlus may be implemented by means of the network of look-up tables. Also, the network of look-up tables may implement steps of a cryptographic scheme, for example an encryption algorithm or a decryption algorithm. Such a decryption algorithm can be used to decrypt content for rendering on display 93. The system comprises a user input 94, for example a keyboard or a remote control, to let a user control the system.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for facilitating tracing copies of an implementation of a computational method, the system comprising:
    a computer processor;
    a network generator for generating, using the computer processor, a network of look-up tables representing steps of the computational method, the network being formed by using an output value of a first look-up table as an input value of a different second look-up table;
    a personalizer for generating a plurality of different versions of the network of look-up tables by changing at least one value in the network of look-up tables, end results of the version corresponding to a relevant domain of input values being substantially the same for each version, each version being unique so that output encodings and/or input decodings of the white-box implementations of the computational method are different in the plurality of different versions;
    an associator for uniquely associating each of the plurality of different versions with an individual station or a user of the station, in a computer readable memory.

2. The system according to claim 1, wherein the computational method includes a cryptographic scheme and a cryptographic key, the network generator and the personalizer being arranged for generating a network of took-up tables operable to perform the cryptographic scheme with the cryptographic key.

3. The system according to claim 1, wherein the personalizer is arranged for creating the white-box implementations of the computational method.

4. The system according to claim 1, wherein the personalizer is arranged for obfuscating the white-box implementations by using an operator, the operator being differently chosen for different versions, where the operator is integrated in a first plurality of look-up tables in the network and an inverse of the operator is integrate in a second plurality of look-up tables in the network.

5. The system according to claim 1, wherein at least one of the first plurality of look-up tables or at least one of the second plurality of look-up tables has input and/or output encodings undone by its respective predecessors and/or successors in the network with respect to a flow of data through the network.

6. The system according to claim 1, wherein the operator is a linear mixing bijection and at least one of the input and/or output encodings is nonlinear.

7. The system according to claim 1, wherein the personalizer is arranged for creating versions using operators in different equivalence classes, where an equivalence class comprises operators of which the corresponding networks of look-up tables can be obtained from each other by applying modifications to the input and/or output encodings from a set of predetermined modifications.

8. The system according to claim 1, wherein the personalizer is arranged for creating versions in different equivalence classes, where an equivalence class comprises versions that can be obtained from each other by applying modifications to the version from a set of predetermined modifications.

9. The system according to claim 1, further comprising an output for delivering the individual version of the network of look-up tables in the memory to the associated station or user via a single medium.

10. The system according to claim 1, wherein the system is for controlled distribution of content to a plurality of stations, and the computational method comprises a decryption method, the system further comprising
    an encryptor for encrypting the version associated with the user with using a user-specific cryptographic key associated with the user, to obtain an encrypted version;
    a content preprocessor for encrypting content according to the cryptographic scheme and the cryptographic key, to obtain encrypted content;
    an output for providing the user with the encrypted version and the encrypted content.

11. A system for performing a computation for a user, comprising:
    a computer processor;
    a data processing unit for applying, using the computer processor, a network of look-up tables representing steps of a computational method to data, the network being formed by using an output value of a first look-up table as an input value of a different second look-up table;
    the network of look-up tables forming a version of a plurality of different versions of the network of look-up tables obtained by changing at least one value in the network of look-up tables, end results of the computational method corresponding to a relevant domain of input values being substantially the same for each version, each version being unique such that output encodings and/or input decodings of the white-box implementations of the computational method are different in the plurality of different versions;
    each of the plurality of different versions being uniquely associated with an individual station or a user of the station, in a computer readable memory.

12. A system for identifying a copy of an implementation of a computational method wherein the implementation comprises a network of look-up tables representing steps of the computational method, the network being formed by using an output value of a first look-up table as an input value of a different second look-up table; the network of look-up tables being a version of a plurality of different versions of the network of look-up tables obtained by changing at least one value in the network of look-up tables, end results of the version corresponding to a relevant domain of input values being substantially the same for each version;
    the system comprising:
    a computer processor;
    an input module for receiving an input version of the network of look-up tables;
    a comparator for comparing the input version in the implementation with at least one of the plurality of different versions in a computer readable memory for storing the plurality of different versions, the comparing done by the computer processor; and an output module for outputting a report of a degree of similarity between the input version and the at least one of the plurality of different versions based on the comparison.

13. The system according to claim 12, further comprising an equivalence class establisher for establishing an equivalence class corresponding to the version in the implementation, where an equivalence class comprises versions that can be obtained from a starting version by applying modifications to the version from a set of modifications available to an attacker.

14. A method of facilitating tracing users of copies of an implementation of a computational method, the method comprising generating, by a computer processor, a network of look-up tables representing steps of the computational method, the network being formed by using an output value of a first look-up table as an input value of a different second look-up table;

generating, by the computer processor, a plurality of different versions of the network of look-up tables by changing at least one value in the network of look-up tables, output values of the version corresponding to a relevant domain of input values being substantially the same for each version, each version being unique such that output encodings and/or input decodings of the white-box implementations of the computational method are different in the plurality of different versions;

uniquely associating each of the plurality of different versions with an individual station or a user of the station, in a computer readable memory.

15. A non-transitory computer readable storage medium storing one or more programs, the one or more programs comprising instructions, which when executed by a computer processor, cause the processor to perform the method according to claim 14.

16. A computer-implemented method of identifying a copy of an implementation of a computational method, wherein the implementation comprises a network of look-up tables representing steps of the computational method, the network being formed by using an output value of a first took-up table as an input value of a different second look-up table;

the network of look-up tables being a version of a plurality of different versions of the network of look-up tables by changing at least one value in the network of look-up tables, end results of the version corresponding to a relevant domain of input values being substantially the same for each version;

the method comprising:

receiving an input version of the network of look-up tables;

comparing the input version in the implementation with at least one of the plurality of different versions in a computer readable memory for storing the plurality of different versions; and providing a report of a degree of similarity between the input version and the at least one of the plurality of different versions based on the comparison.

17. A non-transitory computer readable storage medium storing one or more programs, the one or more programs comprising instructions, which when executed by a computer processor, cause the processor to perform the method according to claim 16.

18. The system according to claim 1, wherein each of different versions is distributable to the corresponding station having a computer processor or a corresponding user of the station.

* * * * *